United States Patent
Manabe et al.

(10) Patent No.: US 9,776,383 B2
(45) Date of Patent: Oct. 3, 2017

(54) BIAXIALLY ORIENTED POLYESTER FILM FOR MOLDING

(71) Applicant: Toray Industries, Inc., Tokyo (JP)

(72) Inventors: Isao Manabe, Otsu (JP); Hideo Shoji, Otsu (JP); Kozo Takahashi, Otsu (JP)

(73) Assignee: Toray Industries, Inc. (JP)

( * ) Notice: Subject to any disclaimer, the term of this patent is extended or adjusted under 35 U.S.C. 154(b) by 656 days.

(21) Appl. No.: 14/368,530

(22) PCT Filed: Dec. 12, 2012

(86) PCT No.: PCT/JP2012/082203
§ 371 (c)(1),
(2) Date: Jun. 25, 2014

(87) PCT Pub. No.: WO2013/099608
PCT Pub. Date: Jul. 4, 2013

(65) Prior Publication Data
US 2015/0017406 A1    Jan. 15, 2015

(30) Foreign Application Priority Data

Dec. 28, 2011 (JP) ................................. 2011-287305
Sep. 3, 2012 (JP) ................................. 2012-192799

(51) Int. Cl.
| | | |
|---|---|---|
| B32B 27/36 | (2006.01) | |
| B32B 27/08 | (2006.01) | |
| C08J 5/18 | (2006.01) | |
| B29C 51/00 | (2006.01) | |
| B29C 55/02 | (2006.01) | |
| B29C 55/14 | (2006.01) | |
| B32B 7/00 | (2006.01) | |
| B32B 7/02 | (2006.01) | |
| B29K 67/00 | (2006.01) | |

(52) U.S. Cl.
CPC ............ *B32B 27/36* (2013.01); *B29C 51/002* (2013.01); *B29C 55/023* (2013.01); *B29C 55/143* (2013.01); *B32B 7/00* (2013.01); *B32B 7/02* (2013.01); *B32B 27/08* (2013.01); *C08J 5/18* (2013.01); *B29K 2067/00* (2013.01); *B32B 2307/306* (2013.01); *B32B 2307/308* (2013.01); *B32B 2307/50* (2013.01); *B32B 2307/51* (2013.01); *B32B 2307/518* (2013.01); *B32B 2307/732* (2013.01); *B32B 2307/734* (2013.01); *B32B 2307/75* (2013.01); *B32B 2451/00* (2013.01); *C08J 2367/02* (2013.01); *C08J 2467/02* (2013.01); *Y10T 428/24942* (2015.01); *Y10T 428/31786* (2015.04)

(58) Field of Classification Search
CPC ............ B32B 27/36; B32B 27/08; C08J 5/18
See application file for complete search history.

(56) References Cited

U.S. PATENT DOCUMENTS

| | | |
|---|---|---|
| 2006/0280959 A1 | 12/2006 | Kumano et al. |
| 2010/0272974 A1 | 10/2010 | Hashimoto et al. |

FOREIGN PATENT DOCUMENTS

| | | | |
|---|---|---|---|
| JP | 2-219832 | 9/1990 | |
| JP | 2001-347565 | 12/2001 | |
| JP | 2005-290354 | 10/2005 | |
| JP | 2008-162220 | 7/2008 | |
| JP | 2010-065065 | 3/2010 | |
| JP | 2010-234673 | * 10/2010 | ............ B29C 55/12 |
| JP | 2010/234673 | 10/2010 | |
| JP | 2011-073151 | 4/2011 | |
| WO | 2012/005097 | 1/2012 | |

OTHER PUBLICATIONS

Supplementary European Search Report dated Apr. 28, 2015 of corresponding European Application No. 12861730.5.

* cited by examiner

*Primary Examiner* — Robert Harlan
(74) *Attorney, Agent, or Firm* — DLA Piper LLP (US)

(57) ABSTRACT

A biaxially oriented polyester film for molding, wherein the film lengthwise-direction and widthwise-direction storage elastic moduli at 100° C. are each greater than or equal to 100 MPa and less than or equal to 1000 MPa, the film lengthwise-direction and width-wise direction storage elastic moduli at 180° C. are each greater than or equal to 41 MPa and less than or equal to 400 MPa, and the stresses at the time of 100% elongation (F100 values) in the film lengthwise direction and width direction at 150° C. are each greater than or equal to 5 MPa and less than or equal to 60 MPa.

13 Claims, No Drawings

BIAXIALLY ORIENTED POLYESTER FILM FOR MOLDING

TECHNICAL FIELD

This disclosure relates to a biaxially oriented polyester film suitably used in a molding process.

BACKGROUND

In recent years, due to growing environmental consciousness, the demand for solventless painting, alternatives to plating and the like is growing in building materials, automotive component parts, cellular phones, electrical machinery products, and the like, and therefore, introduction of a decorating method that uses a film is progressing.

As a polyester film for molding which is used in such a decorating method, various films have been proposed. For example, a polyester film for molding of which a specific molding stress at normal temperature is defined has been proposed (see, e.g., Japanese Patent Application Publication No. 2001-347565).

Furthermore, a polyester film for molding of which a molding stress and a storage elastic modulus at a specific temperature are defined has also been proposed (see, e.g., Japanese Patent Application Publication No. 2005-290354).

Further, a polyester film for molding of which a storage elastic modulus over a wide temperature range is defined has also been proposed (see, e.g., Japanese Patent Application Publication No. 2008-162220).

However, as for the film described in the Japanese Patent Application Publication No. 2001-347565, moldability is not necessarily sufficient, and dimensional stability is not designed by considering the use into which the film is put.

Furthermore, the film described in the Japanese Patent Application Publication No. 2005-290354 has a problem that in a molding method that requires molding at high temperature (around 180° C.), the storage elastic modulus at the time of molding becomes too low, resulting in decline in quality level, such as the roughening of a film surface and the like.

Furthermore, the film described in the Japanese Patent Application Publication No. 2008-162220 exhibits low storage elastic modulus over a wide temperature range and therefore is excellent in moldability. However, the storage elastic modulus in a high temperature region is low so that securing a quality level after molding is not sufficient and satisfactory characteristic in heat resistance is not exhibited.

It could therefore be helpful to provide a biaxially oriented polyester film for molding excellent in moldability, dimensional stability, heat resistance, and post-molding quality level, and is capable of being subjected to a molding process to be suitably used for various molded members.

SUMMARY

We thus provide:

(1) A biaxially oriented polyester film for molding, wherein the film lengthwise-direction and widthwise-direction storage elastic moduli at 100° C. are each greater than or equal to 100 MPa and less than or equal to 1000 MPa, the film lengthwise-direction and width-wise direction storage elastic moduli at 180° C. are each greater than or equal to 41 MPa and less than or equal to 400 MPa, and the stresses (F100 values) at the time of 100% elongation in the film lengthwise direction and width direction at 150° C. are each greater than or equal to 5 MPa and less than or equal to 60 MPa.

(2) The biaxially oriented polyester film for molding according to (1), which is a laminate polyester film having a polyester A layer and a polyester B layer, wherein in a 1st run of differential scanning calorimetry (DSC), crystal melting peak temperature (TmA) of the polyester A layer is greater than or equal to 246° C. and less than or equal to 254° C., and crystal melting peak temperature (TmB) of the polyester B layer is greater than or equal to 235° C. and less than 246° C.

(3) The biaxially oriented polyester film for molding according to (2), wherein in a 2nd run of the differential scanning calorimetry (DSC), temperature-rise crystallization temperature (Tcc) of the laminate polyester film is greater than or equal to 170° C. and less than or equal to 190° C.

(4) The biaxially oriented polyester film for molding according to any one of (1) to (3), which is a laminate polyester film having a polyester A layer and a polyester B layer, wherein:

the polyester A layer contains greater than or equal to 90 mol % and less than or equal to 99 mol % of ethylene glycol-derived structural units, and greater than or equal to 1 mol % and less than or equal to 10 mol % of 1,4-cyclohexane dimethanol-derived structural units and/or neopentyl glycol-derived structural units, relative to diol-derived structural units; and the polyester B layer contains greater than or equal to 80 mol % and less than or equal to 90 mol % of ethylene glycol-derived structural units, and greater than or equal to 10 mol % and less than or equal to 20 mol % of 1,4-cyclohexane dimethanol-derived structural units and/or neopentyl glycol-derived structural units, relative to diol-derived structural units.

(5) The biaxially oriented polyester film for molding according to (4), wherein: the polyester A layer contains greater than or equal to 95 mol % and less than or equal to 99 mol % of the ethylene glycol-derived structural units, and greater than or equal to 1 mol % and less than or equal to 5 mol % of the 1,4-cyclohexane dimethanol-derived structural units and/or the neopentyl glycol-derived structural units, relative to the diol-derived structural units; and the polyester B layer contains greater than or equal to 80 mol % and less than or equal to 85 mol % of the ethylene glycol-derived structural units, and greater than or equal to 15 mol % and less than or equal to 20 mol % of the 1,4-cyclohexane dimethanol-derived structural units and/or the neopentyl glycol-derived structural units, relative to the diol-derived structural units.

(6) The biaxially oriented polyester film for molding according to (4), wherein: the polyester A layer contains greater than or equal to 90 mol % and less than 95 mol % of the ethylene glycol-derived structural units, and greater than 5 mol % and less than or equal to 10 mol % of the 1,4-cyclohexane dimethanol-derived structural units and/or the neopentyl glycol-derived structural units, relative to the diol-derived structural units; and the polyester B layer contains greater than or equal to 80 mol % and less than or equal to 90 mol % of the ethylene glycol-derived structural units, and greater than or equal to 10 mol % and less than or equal to 20 mol % of the 1,4-cyclohexane dimethanol-derived structural units and/or the neopentyl glycol-derived structural units, relative to the diol-derived structural units.

(7) The biaxially oriented polyester film for molding any one of (4) to (6), wherein: the polyester A layer contains greater than or equal to 95 mol % and less than or equal to 100 mol % of terephthalic acid (including terephthalic acid ester) derived structural units relative to dicarboxylic acid (including dicarboxylic acid ester) derived structural units; and the polyester B layer contains greater than or equal to 95 mol % and less than or equal to 100 mol % of terephthalic acid (including terephthalic acid ester) derived structural units relative to dicarboxylic acid (including dicarboxylic acid ester) derived structural units.

(8) The biaxially oriented polyester film for molding according to any one of (1) to (7), wherein lamination ratio H(–) between the polyester A layer and the polyester B layer is greater than or equal to 0.01 and less than or equal to 0.4.

(9) The biaxially oriented polyester film for molding according to any one of (1) to (8), wherein the polyester A layer is located at least one of outermost layers.

(10) The biaxially oriented polyester film for molding according to any one of (1) to (9), wherein thermal shrinkage ratios at 150° C. in the lengthwise direction and the widthwise direction are both greater than or equal to –1% and less than or equal to 1%.

(11) The biaxially oriented polyester film for molding according to any one of (1) to (10), wherein thermal deformation ratio of the film at 150° C. in at least one direction during a temperature rise from 25° C. to 220° C. at a temperature rise speed of 5° C./min, with a load of 19.6 mN, is 0 to +3%.

(12) The biaxially oriented polyester film for molding according to any one of claims 1 to 11, wherein thermal deformation ratio of the film at 180° C. in at least one direction during a temperature rise from 25° C. to 220° C. at a temperature rise speed of 5° C./min, with a load of 19.6 mN, is 0 to +3%.

(13) The biaxially oriented polyester film for molding according to any one of (2) to (12), wherein crystal melting peak temperature (Tm1) of a laminate polyester film in the 1st run of the differential scanning calorimetry (DSC) and crystal melting peak temperature (Tm2) of the entire film in a 2nd run satisfy the below-mentioned expression (I).

$$Tm1<Tm2 \quad (I)$$

(14) A molded member using the biaxially oriented polyester film for molding according to any one of (1) to (13).

The biaxially oriented polyester film for molding is low in the storage elastic modulus at 100° C., and low in the molding stress at 150° C. so that the film can be thermally shaped at such a low temperature as 100° C. to 150° C. Furthermore, the film's storage elastic modulus at 180° C. is in a specific range so that even in a molding method that requires high-temperature molding, the decline in quality level at the time of molding can be restrained. That is, the film is excellent in moldability, dimensional stability, heat resistance, and post-molding quality level, and can be subjected to a molding process so as to be suitably used for various molded members. For example, the film can be suitably used for decoration of molded members such as building materials, mobile appliances, electrical machinery products, automotive component parts, amusement machine component parts and the like.

DETAILED DESCRIPTION

The polyester that constitutes the biaxially oriented polyester film for molding is a collective term for high molecular compounds whose main chain has an ester bond as a main bond. Then, the polyester resin can be obtained usually by causing a polycondensation reaction between dicarboxylic acid or its derivative and glycol or its derivative.

From the viewpoint of moldability, external appearance, heat resistance, dimensional stability and economic efficiency, it is preferable that greater than or equal to 60 mol % of the glycol units that constitute the polyester be ethylene glycol-derived structural units and that greater than or equal to 60 mol % of the dicarboxylic acid units be terephthalic acid-derived structural units. Incidentally, the dicarboxylic acid unit (structural unit) or the diol unit (structural unit) means a bivalent organic group from which a portion that is removed by polycondensation has been removed, and, in short, is represented by the formula below. dicarboxylic acid unit (structural unit): —CO—R—CO— diol unit (structural unit): —O—R'—O—

(where R and R' are bivalent organic groups)

Incidentally, the same applies to the meanings of the units (structural units) regarding carboxylic acids or alcohols having a valence number of three or more, such as trimellitic acid units and glycerin units.

As the glycol or its derivative that provides a polyester, what can be cited besides ethylene glycol are aliphatic dihydroxy compound such as 1,2-propane diol, 1,3-propane diol, 1,3-butanediol, 1,4-butanediol, 1,5-pentanediol, 1,6-hexanediol, neopentyl glycol, etc., polyoxyalkylene glycol such as diethylene glycol, polyethylene glycol, polypropylene glycol, polytetramethylene glycol, etc., alycyclic dihydroxy compounds such as 1,4-cyclohexane dimethanol, spiroglycol, etc., aromatic dihydroxy compounds such as bisphenol A, bisphenol S, etc., and their derivatives. Among these, 1,3-propane diol, 1,4-butanediol, neopentyl glycol and 1,4-cyclohexane dimethanol are preferably used in respect of moldability and handling characteristic.

Furthermore, as the dicarboxylic acid or its derivative that provides a polyester, what can be cited besides terephthalic acid are aromatic dicarboxylic acids such as isophthalic acid, phthalic acid, 2,6-naphthalene dicarboxylic acid, diphenyl dicarboxylic acid, diphenyl sulfone dicarboxylic acid, diphenoxy ethane dicarboxylic acid, 5-sodium sulfone dicarboxylic acid, etc., aliphatic dicarboxylic acids such as oxalic acid, succinic acid, adipic acid, sebacic acid, dimer acid, maleic acid, fumaric acid, etc., alycyclic dicarboxylic acids such as 1,4-cyclohexane dicarboxylic acid, etc., oxycarboxylic acids such as paraoxybenzoic acid, etc., and their derivatives. As derivatives of dicarboxylic acid, there can be cited, for example, esterified substances such as terephthalic acid dimethyl, terephthalic acid diethyl, terephthalic acid 2-hydroxy ethyl methyl ester, 2,6-naphthalene dicarboxylic acid dimethyl, isophthalic acid dimethyl, adipic acid dimethyl, maleic acid diethyl, dimer acid dimethyl, etc. Among these, isophthalic acid, 2,6-naphthalene dicarboxylic acid, 1,4-cyclohexane dicarboxylic acid and their esterified substances are preferably used, in respect of moldability and handling characteristic.

The film lengthwise-direction and widthwise-direction storage elastic moduli at 100° C. need to be greater than or equal to 100 MPa and less than or equal to 1000 MPa, from the point of view of the moldability at low temperature and the dimensional stability at the time of process. More preferably, the film lengthwise-direction and widthwise-direction storage elastic moduli at 100° C. are greater than or equal to 300 MPa and less than or equal to 950 MPa, and it is the most preferable if they are greater than or equal to 500 MPa and less than or equal to 900 MPa. Setting the film lengthwise-direction and widthwise-direction storage elastic moduli at 100° C. in the foregoing ranges enables thermal shaping even at relatively low temperature near 100° C., and therefore enables the shortening of the pre-heating time at the time of molding and use of the film in a print layer that is low in heat resistance or in a construction in which the film is laminated with a coating layer and, furthermore, makes it possible to retain dimensional stability in processing steps such as printing, vapor deposition, coating and laminating.

Furthermore, the film lengthwise-direction and widthwise-direction storage elastic moduli at 180° C. need to be greater than or equal to 41 MPa and less than or equal to 400 MPa, from the point of view of the moldability in a high temperature region, restraint of the decline in quality level at the time of molding, and heat resistance. If the storage elastic modulus at 180° C. is less than 41 MPa, there are cases where the heat resistance becomes low resulting in decline of the quality level, such as the roughening of a film surface at the time of molding at high temperature, etc. Conversely, if the storage elastic modulus at 180° C. becomes greater than 400 MPa, there are cases where moldability deteriorates even in a high temperature region; therefore, such a high storage elastic modulus at 180° C. is not preferable. From the point of view of heat resistance and moldability, it is more preferable if the film lengthwise-direction and widthwise-direction storage elastic moduli at 180° C. are greater than or equal to 70 MPa and less than or equal to 300 MPa, and it is the most preferable if they are greater than or equal to 90 MPa and less than or equal to 200 MPa. Setting the film lengthwise-direction and widthwise-direction storage elastic moduli at 180° C. in the foregoing ranges makes it possible to sufficiently retain a quality level of the film even in the case where the molding in a high temperature range near 180° C. is needed, and therefore also makes possible the use of the film as a laminate component with a resin that is difficult to shape at low temperature or the like and, therefore, is preferable.

The film's stresses (F100 values) at the time of 100% elongation in the lengthwise direction and the width direction at 150° C. both need to be greater than or equal to 5 MPa and less than or equal to 60 MPa, from the viewpoint of the molding followability to complicated shapes, and the film transportability. By making the molding stress low, the follow to complicated shapes become possible. If the F100 value is less than 5 MPa, the film cannot withstand the tension for transporting the film in a pre-heating step in the molding process, and there are cases where the film deforms or sometimes breaks and, thus, a film that is unusable in molding uses. Conversely, if the F100 value exceeds 60 MPa, deformation at the time of thermal molding is insufficient, and the following to a complicated shape becomes difficult. In respect of handling characteristic and moldability, it is preferable if the film's stresses (F100 values) at the time of 100% elongation in the lengthwise direction and the widthwise direction at 150° C. are greater than or equal to 10 MPa and less than or equal to 50 MPa, and it is the most preferable if they are greater than or equal to 10 MPa and less than or equal to 45 MPa. Furthermore, in the case where the film is used for a particularly complicated shape, the film's stresses (F100 values) at the time of 100% elongation in the lengthwise direction and the widthwise direction at 150° C. are preferred to be greater than or equal to 5 MPa and less than or equal to 30 MPa.

Furthermore, the film lengthwise-direction and widthwise-direction breaking elongation degrees at 150° C. are each preferred to be greater than or equal to 100% and less than or equal to 500% to mold the film into a more complicated shape. Even in the case where the film is molded into a complicated shape, the following at a molding process scaling ratio can be achieved, and the film can be made excellent in economic efficiency and heat resistance. In respect of moldability, heat resistance and economic efficiency, it is preferable that the film lengthwise-direction and widthwise-direction elongation degrees are greater than or equal to 100% and less than or equal to 400%, and it is the most preferable that they are greater than or equal to 150% and less than or equal to 400%.

The storage elastic modulus at 100° C. is controlled to greater than or equal to 100 MPa and less than or equal to 1000 MPa, and the film lengthwise-direction and widthwise-direction storage elastic moduli at 180° C. are controlled to greater than or equal to 41 MPa and less than or equal to 400 MPa, and furthermore, the film's stresses (F100 values) at the time of 100% elongation in the lengthwise direction and the width direction at 150° C. are each greater than or equal to 5 MPa and less than or equal to 60 MPa. Therefore, decline in the quality level of the film can be restrained even in high-temperature molding. Furthermore, since the following to complicated shapes is possible, the molding of the film into complicated shapes in a wide temperature region is possible. Hence, the film is applicable to various molding methods.

In conjunction with the biaxially oriented polyester film for molding, as a method that simultaneously satisfies the conditions that the storage elastic modulus at 100° C. is greater than or equal to 100 MPa and less than or equal to 1000 MPa, and the film lengthwise-direction and widthwise-direction storage elastic moduli at 180° C. are greater than or equal to 41 MPa and less than or equal to 400 MPa, and the film's stresses (F100 values) at the time of 100% elongation in the lengthwise direction and the widthwise direction at 150° C. are each greater than or equal to 5 MPa and less than or equal to 60 MPa, it is preferable to, for example, have a laminate polyester film having a polyester A layer and a polyester B layer. By having a laminate construction of the polyester A layer and the polyester B layer, and, for example, maintaining high storage elastic modulus of the polyester A layer even in a high temperature region, and having the polyester B layer as a layer that exhibits low storage elastic modulus even in a low temperature region, it becomes possible to carry out the molding in a targeted wide temperature region.

When the biaxially oriented polyester film for molding is a laminate polyester film that has a polyester A layer and a polyester B layer, it is preferable that the crystal melting peak temperature (TmB) of the polyester B layer in the 1st run of the differential scanning calorimetry (DSC) be greater than or equal to 235° C. and less than 246° C., from the point of view of the dimensional stability and the thermal shaping characteristic in a low temperature region. If the crystal melting peak temperature (TmB) of the polyester B layer is less than 235° C., the dimensional stability declines. On the other hand, if the crystal melting peak temperature (TmB) of the polyester B layer is greater than or equal to 246° C., there are cases where the thermal shaping characteristic in a low temperature region declines. More preferably, the crystal melting peak temperature of the polyester B layer is greater than or equal to 236° C. and less than or equal to 244° C., and it is the most preferable that the crystal melting peak temperature of the polyester B layer is greater than or equal to 237° C. and less than or equal to 243° C. When there are a plurality of crystal melting peaks, the temperature at which the absolute value of heat flow is the greatest is determined as a crystal melting peak temperature.

When the biaxially oriented polyester film for molding is a laminate polyester film that has a polyester A layer and a polyester B layer, it is preferable that the crystal melting peak temperature (TmA) of the polyester A layer in the 1st run of the differential scanning calorimetry (DSC) be greater than or equal to 246° C. and less than or equal to 254° C., from the point of view of moldability and the heat resistance in a high temperature region. If the crystal melting peak temperature (TmA) of the polyester A layer is less than 246° C., the heat resistance declines. On the other hand, if the crystal melting peak temperature (TmA) of the polyester A layer is higher than 254° C., there are cases where the moldability declines. More preferably, the crystal melting peak temperature (TmA) of the polyester A layer is greater than or equal to 247° C. and less than or equal to 253° C., and it is the most preferable if the crystal melting peak temperature (TmA) of the polyester A is greater than or equal to 248° C. and less than or equal to 252° C. When there are a plurality of crystal melting peaks, the temperature at which the absolute value of heat flow is the greatest is determined as a crystal melting peak temperature.

From the point of view of the thermal shaping characteristic in a low temperature region, dimensional stability, the heat resistance in a high temperature region and moldability, it is preferable that the film be a laminate polyester film that has a polyester A layer and a polyester B layer, and the crystal melting peak temperature (TmA) of the polyester A layer in the 1st run of the differential scanning calorimetry (DSC) be greater than or equal to 246° C. and less than or equal to 254° C., and the crystal melting peak temperature (TmB) of the polyester B layer in the 1st run be greater than or equal to 235° C. and less than 246° C.

As a preferable mode for causing the crystal melting peak temperature of the polyester B layer to be in the foregoing range, it is preferable that the polyester B layer contain (composition b-1), relative to diol-derived structural units, relative to diol-derived structural units (hereinafter, referred to as diol units), greater than or equal to 80 mol % and less than or equal to 90 mol % of ethylene glycol-derived structural units (hereinafter, referred to as EG units), and greater than or equal to 10 mol % and less than or equal to 20 mol % of 1,4-cyclohexane dimethanol-derived structural units (hereinafter, referred to as CHDM units) and/or neopentyl glycol-derived structural units (hereinafter, referred to as NPG units).

Furthermore, to cause the crystal melting peak temperature of the polyester B layer to be in the foregoing range, the polyester B layer is preferred to be a composition b-1(i), (ii) as follows.

Composition b-1(i)
Diol units: greater than or equal to 80 mol % and less than or equal to 90 mol % of EG units, and
greater than or equal to 10 mol % and less than or equal to 20 mol % of CHDM units and/or NPG units.
Greater than or equal to 95 mol % and less than or equal to 100 mol % of terephthalic acid (including terephthalic acid ester) derived structural units (hereinafter, referred to as TPA units) relative to dicarboxylic acid (including dicarboxylic acid ester) derived structural units (hereinafter, referred to as dicarboxylic acid units).

Composition b-1(ii)
Diol units: greater than or equal to 80 mol % and less than or equal to 90 mol % of EG units, and
greater than or equal to 10 mol % and less than or equal to 20 mol % of CHDM units.
Dicarboxylic acid unit: greater than or equal to 95 mol % and less than or equal to 100 mol % of TPA units.

As a preferable mode for causing the crystal melting peak temperature of the polyester A layer to be in the forgoing range, the polyester A layer is preferred to be a composition a-1 as follows.

Composition a-1
Diol units: greater than or equal to 90 mol % and less than or equal to 99 mol % of EG units greater than or equal to 1 mol % and less than or equal to 10 mol % of CHDM units and/or NPG units Furthermore, the mode of causing the crystal melting peak temperature of the polyester A layer to be in the foregoing range is particularly preferably the composition a-1(i), (ii).

Composition a-1(i)
Diol units; greater than or equal to 90 mol % and less than or equal to 99 mol % of EG units greater than or equal to 1 mol % and less than or equal to 10 mol % of CHDM units and/or NPG units
Dicarboxylic acid units: greater than or equal to 95 mol % and less than or equal to 100 mol % of TPA units Composition a-1(ii)
Diol units: greater than or equal to 90 mol % and less than or equal to 99 mol % of EG units greater than or equal to 1 mol % and less than or equal to 10 mol % of CHDM units
Dicarboxylic acid-derived structural units: greater than or equal to 95 mol % and less than or equal to of 100 mol % of TPA units From the point of view of the thermal shaping characteristic in a low temperature region, the dimensional stability, the heat resistance in a high temperature region and moldability, it is preferable that the film be a laminate polyester film that has the polyester A layer and the polyester B layer, and that the polyester A layer and the polyester B layer be a composition a-1 ((i) or (ii)) and a composition b-1 ((i) or (ii)), respectively.

Furthermore, in the case of being used in an application where high scratch resistance is required, it is preferable that the film be a laminate polyester film that has a polyester A layer and a polyester B layer, and the polyester A layer be a composition a-2 or a composition a-2(i).

Composition a-2
Diol units: greater than or equal to 95 mol % and less than or equal to 99 mol % of EG units greater than or equal to 1 mol % and less than or equal to 5 mol % of CHDM units and/or NPG units Composition a-2(i)
Diol units: greater than or equal to 95 mol % and less than or equal to 99 mol % of EG units greater than or equal to 1 mol % and less than or equal to 5 mol % of CHDM units Furthermore, particularly preferred as a mode in which the crystal melting peak temperature of the polyester A layer is in the foregoing range and scratch resistance is further enhanced is a composition a-2(ii).

Composition a-2(ii)
Diol units: greater than or equal to 95 mol % and less than or equal to 99 mol % of EG units greater than or equal to 1 mol % and less than or equal to 5 mol % of CHDM units and/or NPG units Dicarboxylic acid-derived structural units: greater than or equal to 95 mol % and less than or equal to 100 mol % of TPA units Further, it is preferable that the form is a composition a-2(iii).

Composition a-2(iii)
Diol units: greater than or equal to 95 mol % and less than or equal to 99 mol % of EG units greater than or equal to 1 mol % and less than or equal to 5 mol % of CHDM units
Dicarboxylic acid-derived structural units: greater than or equal to 95 mol % and less than or equal to 100 mol % of TPA units Further, in order to achieve both the thermal shaping characteristic in a low temperature region and the moldability in a high temperature region while maintaining enhanced scratch resistance,
it is preferable that the polyester B layer be a composition b-2.

Composition b-2
Diol units: greater than or equal to 80 mol % and less than or equal to 85 mol % of EG units greater than or equal to 15 mol % and less than or equal to 20 mol % of CHDM units and/or NPG units Further, the polyester B layer is preferred to be a composition b-2(i).

Composition b-2(i)
Diol units: greater than or equal to 80 mol % and less than or equal to 85 mol % of EG units greater than or equal to 15 mol % and less than or equal to 20 mol % of CHDM units Furthermore, particularly preferable as a mode for causing the crystal melting peak temperature of the polyester B layer to be in the foregoing range, is that the polyester B layer is preferred to be a composition b-2(ii).

Composition b-2(ii)
Diol units: greater than or equal to 80 mol % and less than or equal to 85 mol % of EG units greater than or equal to 15 mol % and less than or equal to 20 mol % of CHDM units and/or NPG units
Dicarboxylic acid-derived structural units: greater than or equal to 95 mol % and less than or equal to 100 mol % of TPA units Furthermore, the polyester B layer is preferred to be a composition b-2(iii).

Composition b-2(iii)
Diol units: greater than or equal to 80 mol % and less than or equal to 85 mol % of EG units greater than or equal to 15 mol % and less than or equal to 20 mol % of CHDM units
Dicarboxylic acid-derived structural units: greater than or equal to 95 mol % and less than or equal to 100 mol % of TPA units To achieve both scratch resistance, the thermal shaping characteristic in a low temperature region and the moldability in a high temperature region, it is preferable that the film be a laminate polyester film having a polyester A layer and a polyester B layer, and that the polyester A layer and the polyester B layer be the composition a-2 (one of (i) to (iii)) and the b-2 (one of (i) to (iii)), respectively, in combination.

Furthermore, when the crystal melting peak temperature of the polyester A layer is in the foregoing range and the film is molded at low temperature, to improve the thermal shaping characteristic in a lower temperature region, it is preferable that the film be a laminate polyester film having the polyester A layer and the polyester B layer, and that the A layer be a composition a-3.

Composition a-3
Diol units: greater than or equal to of 90 mol % and less than 95 mol % of EG units greater than 5 mol % and less than or equal to 10 mol % of CHDM units and/or NPG units
Dicarboxylic acid-derived structural units: greater than or equal to 95 mol % and less than or equal to 100 mol % of TPA units Further, the A layer is preferred to be a composition a-3(i).

Composition a-3(i)
Diol units: greater than or equal to 91 mol % and less than 95 mol % of EG units greater than 5 mol % and less than or equal to 9 mol % of CHDM units and/or NPG units Furthermore, the A layer is more preferred to be a composition a-3(ii) or a-3(iii).

Composition a-3(ii)
Diol units: greater than or equal to of 90 mol % and less than 95 mol % of EG units greater than 5 mol % and less than or equal to 10 mol % of CHDM units, Composition a-3(iii)
Diol units: greater than or equal to 91 mol % and less than or equal to 95 mol % of EG units greater than 5 mol % and less than or equal to 9 mol % of CHDM units Furthermore, particularly preferable as a mode in which the crystal melting peak temperature of the polyester A layer is in the foregoing range and the low-temperature thermal shaping characteristic is enhanced, is that the polyester A layer is preferred to be a composition a-4.

Composition a-4
Diol units: greater than or equal to of 90 mol % and less than 95 mol % of EG units greater than 5 mol % and less than or equal to 10 mol % of CHDM units and/or NPG units
Dicarboxylic acid-derived structural units: greater than or equal to 95 mol % and less than or equal to 100 mol % of TPA units Further, the A layer is preferred to be a composition a-4(i).

Composition a-4(i)
Diol units: greater than or equal to 91 mol % and less than or equal to 95 mol % of EG units greater than 5 mol % and less than or equal to 9 mol % of CHDM units and/or NPG units
Dicarboxylic acid-derived structural units: greater than or equal to 95 mol % and less than or equal to 100 mol % of TPA units Furthermore, the polyester A layer is more preferred to be a composition a-4(ii) or a composition a-4(iii).

Composition a-4(ii)
Diol units: greater than or equal to 90 mol % and less than or equal to 95 mol % of EG units greater than 5 mol % and less than or equal to 10 mol % of CHDM units
Dicarboxylic acid-derived structural units: greater than or equal to 95 mol % and less than or equal to 100 mol % of TPA units Composition a-4(iii)
Diol units: greater than or equal to 91 mol % and less than or equal to 95 mol % of EG units greater than 5 mol % and less than or equal to 9 mol % of CHDM units
Dicarboxylic acid-derived structural units: greater than or equal to 95 mol % and less than or equal to 100 mol % of TPA units Further, in order to achieve both the dimensional stability and the thermal shaping characteristic in a low temperature region, it is preferable that the polyester B layer be a composition b-4.

Composition b-4
  Diol units: greater than or equal to 85 mol % and less than or equal to 90 mol % of EG units greater than or equal to 10 mol % and less than or equal to 15 mol % of CHDM units and/or NPG units
  Dicarboxylic acid-derived structural units: greater than or equal to 95 mol % and less than or equal to 100 mol % of TPA units and, the A layer is preferred to be a composition b-4(i).

Composition b-4(i)
  Diol units: greater than or equal to 85 mol % and less than or equal to 90 mol % of EG units greater than or equal to 10 mol % and less than or equal to 15 mol % of CHDM units Furthermore, particularly preferable as a mode for causing the crystal melting peak temperature of the polyester B layer to be in the foregoing range, is that the polyester B layer is composition b-4(ii), and is more preferred to be a composition b-4(iii).

Composition b-4(ii)
  Diol units: greater than or equal to 85 mol % and less than or equal to 90 mol % of EG units greater than or equal to 10 mol % and less than or equal to 15 mol % of CHDM units and/or NPG units
  Dicarboxylic acid-derived structural units: greater than or equal to 95 mol % and less than or equal to 100 mol % of TPA units Composition b-4(iii)
  Diol units: greater than or equal to 85 mol % and less than or equal to 90 mol % of EG units greater than or equal to 10 mol % and less than or equal to 15 mol % of CHDM units
  Dicarboxylic acid-derived structural units: greater than or equal to 95 mol % and less than or equal to 100 mol % of TPA units To achieve both the scratch resistance, the thermal shaping characteristic in a low temperature region and the moldability in a high temperature region, it is preferable that the film be a laminate polyester film having a polyester A layer and a polyester B layer, and that the polyester A layer and the polyester B layer be a composition a-4 (one of (i) to (iii)) and a composition b-4 (one of (i) to (iii)), respectively.

It is preferable that the temperature-rise crystallization temperature (Tcc) of the entire film in the 2nd run of the differential scanning calorimetry (DSC) be greater than or equal to 170° C. and less than or equal to 190° C. The temperature-rise crystallization temperature (Tcc) of the entire film in the 2nd of the differential scanning calorimetry (DSC) being greater than or equal to 170° C. and less than or equal to 190° C. indicates that while the film has sufficient crystallinity, the crystallization speed is slow, that is, crystal and random amorphous are formed simultaneously. Due to this, effects of the thermal shaping characteristic in a low temperature region, dimensional stability, the heat resistance in a high temperature region, and moldability, which are features, can be further increased. As for the temperature-rise crystallization temperature (Tcc), it is more preferable if the temperature-rise crystallization temperature (Tcc) is greater than or equal to 175° C. and less than or equal to 190° C., and it is the most preferable if it is greater than or equal to 175° C. and less than or equal to 185° C. As a method causing the temperature-rise crystallization temperature (Tcc) of the entire film in the 2nd run of the differential scanning calorimetry (DSC) to be greater than or equal to 170° C. and less than or equal to 190° C., it is preferable to obtain a preferable composition as mentioned above and perform the discharging from a T die at a resin temperature of 265 to 290° C. through an average residence time of 15 to 50 minutes. If the resin temperature is lower than 265° C. or the average residence time is less than 15 minutes, there are cases where the random amorphous structure is not sufficiently formed and the temperature-rise crystallization temperature (Tcc) is less than 170° C. On the other hand, if the resin temperature is higher than 290° C., there are cases where the crystallinity declines and the temperature-rise crystallization temperature (Tcc) is higher than 190° C. Herein, the average residence time is time that it takes the polyester resin placed in an extruder to be discharged from the T die, and can be appropriately adjusted by the screw rotation speed of the extruder and the rotation speed of a gear pump. Incidentally when there are a plurality of temperature-rise crystallization peaks, the temperature at which the absolute value of heat flow is the greatest is determined as a temperature-rise crystallization peak temperature.

Furthermore, it is preferred that the biaxially oriented polyester film be a laminate polyester film having a polyester A layer and a polyester B layer, and that when in the 1st run of the differential scanning calorimetry (DSC), the crystal melting peak temperature (TmA) of the polyester A layer is greater than or equal to 246° C. and less than or equal to 254° C. and the crystallization melting peak temperature (TmB) of the polyester B layer is greater than or equal to 235° C. and less than 246° C., the crystal melting peak temperature (Tm1) of the entire film in the 1st run of the differential scanning calorimetry (DSC) and the crystal melting peak temperature (Tm2) of the entire film in the 2nd run satisfy the below-mentioned expression (I), from the point of view of the followability to complicated shapes, the inter-layer adhesion property between the polyester A layer and the polyester B layer.

$$Tm1 < Tm2 \qquad (I)$$

In both the 1st run and the 2nd run of the differential scanning calorimetry (DSC), if there are a plurality of crystal melting peaks, the temperature at which the absolute value of heat flow is the greatest is determined as a crystal melting peak temperature.

We found that satisfaction of the expression (I) achieves excellent moldability over a wide temperature region. Satisfaction of the expression (I) means that in the 1st run, the crystal melting peaks resulting from the polyester A layer and the polyester B layer occur, and contribution of the polyester B layer, which is lower in the crystal melting peak temperature, is great (the absolute value of heat flow is great), so the crystal melting peak temperature of the film as a whole becomes low, but that in the 2nd run after the film has once been melted, the crystal melting peak temperature of the film as a whole becomes high due to the effect of the polyester A layer, which is higher in the crystal melting peak temperature.

So that the crystal melting peak temperature (Tm1) of the entire film in the 1st run of the differential scanning calorimetry (DSC) and the crystal melting peak temperature (Tm2) in the 2nd run will satisfy the expression (I), a difference (TmA−TmB) between the crystal melting peak temperature (TmA) of the polyester A layer and the crystal melting peak temperature (TmB) of the polyester B layer is preferred to be greater than or equal to 5° C. and less than or equal to 20° C., and is more preferred to be greater than or equal to 10° C. and less than or equal to 20° C.

It is preferred to obtain a laminate film construction as mentioned above, cause a polymer composition to be a specific composition, and select a specific production condition as mentioned below. That is, as for the extruder, it is preferable to use a twin-screw extruder, and it is particularly preferable to use a same-direction twin-screw extruder.

Furthermore, as for the cylinder temperature of the extruder at the time of melt extrusion, it is preferable that the temperatures of the polyester A layer-side extruder and the polyester B layer-side extruder be both 270 to 295° C., and the resin temperature be 265 to 290° C., and that the cylinder temperature of the polyester A layer-side extruder be higher than the cylinder temperature of the polyester B layer-side extruder by 5° C. to 10° C. Furthermore, it is preferred that the short-pipe temperature after confluence of the A layer and the B layer be set to the extruder temperature at the B layer side, and it is preferred that the mouthpiece temperature be set higher than the extruder temperature at the B layer side.

As drawing conditions where the crystal melting peak temperature (Tm1) of the entire film in the 1st run of the differential scanning calorimetry (DSC) and the crystal melting peak temperature (Tm2) of the entire film in the 2nd run thereof satisfy the foregoing expression (I), the drawing temperature is preferred to be low to such a degree that unevenness of drawing does not occur, and the draw ratio is preferred to be high. In particular, to satisfy the foregoing expression (I) while the crystal melting peak temperature (Tm2) of the entire film in the 2nd run is in a specific range, it is preferable that the thermal process temperature after the drawing be high temperature and be less than or equal to the crystal melting peak temperature of the polyester B layer. Particularly preferably, it is preferred that the heat treatment temperature be a temperature that is lower than the crystal melting peak temperature (TmB) of the B layer by greater than or equal to 2° C. and less than or equal to 15° C. Drawing can be carried out by a sequential biaxial drawing method in which an undrawn film is drawn in a longitudinal direction, and then is drawn in a width direction, or in which an undrawn film is drawn substantially simultaneously in the lengthwise direction and widthwise direction of the film. As preferable draw ratios, a ratio of greater than or equal to 3.5 and less than or equal to 4.2 in each of the lengthwise direction and the width wise direction is preferably adopted. Furthermore, it is desirable that the drawing speed is desirable be greater than or equal to 1,000%/min and less than or equal to 200,000%/min. Furthermore, the drawing temperature is preferred to be greater than or equal to 70° C. and less than or equal to 90° C. in the lengthwise direction, and greater than or equal to 80° and less than or equal to 110° in the widthwise direction. Furthermore, drawing may be performed a plurality of times in each one of the directions.

Furthermore, the heat treatment subsequent to the biaxial drawing can be performed by an arbitrary method such as in an oven or on a heated roll. This heat treatment is preferred to be at greater than or equal to 220° C. and less than or equal to 240° C. and be at a temperature that is lower than the crystal melting peak temperature of the polyester B layer by a greater than or equal to 2° C. and less than or equal to 15° C., more preferably, lower by greater than or equal to 2° C. and less than or equal to 10° C., and, most preferably, lower by greater than or equal to 2° C. and less than or equal to 7° C. Incidentally, the heat treatment temperature can be found by a small endothermic peak temperature (Tmeta) prior to the crystal melting peak temperature resulting from a thermal hysteresis on a DSC curve based on the measurement at a temperature rise speed of 20° C./min in a nitrogen atmosphere by a differential scanning calorimeter (DSC).

Furthermore, as a preferred heat treatment time, arbitrary setting can be made 5 to 60 seconds. However, from the point of view of moldability, dimensional stability, color tone and productivity, the time is preferred to be set at 10 to 40 seconds and, preferably, 15 to 30 seconds. Furthermore, performing the heat treatment while loosening the film in the lengthwise direction and/or the widthwise direction can reduce the thermal shrinkage ratio, and is therefore preferable. A preferable loosening rate (relax rate) at the time of heat treatment is greater than or equal to 3%. From the point of view of dimensional stability and productivity, it is more preferable if the loosening rate is greater than or equal to 3% and less than or equal to 10%, and it is the most preferable if the loosening rate is greater than or equal to 3% and less than or equal to 5%.

Furthermore, a method in which the heat treatment is performed in a condition with two or more steps is also very preferable. After the heat treatment at high temperature of 220° C. to 240° C., subjecting the film to heat treatment while loosening the film in the lengthwise direction and/or the widthwise direction at a temperature lower than the heat treatment temperature makes it possible to further reduce the thermal shrinkage ratio. As for the heat treatment temperature in the second step at this time, it is preferable if the temperature is 120° C. and 180° C., and it is further preferable if the temperature is 150° C. to 180° C.

Furthermore, it is preferable that the A layer's lamination ratio H(−)(H(−)=(the thickness of the A layer) (μm)/(the thickness of the entire film) (μm)) be greater than or equal to 0.01 and less than or equal to 0.4. An attempt to make the lamination ratio less than 0.01 will sometimes result in an excessively thin thickness of the A layer and uneven lamination, and is therefore not preferable. Furthermore, the case where the lamination ratio is greater than 0.4 will sometimes result in a declined thermal shaping characteristic in a low temperature region, and is therefore not preferable. It is preferable if the lamination ratio H(−) is greater than or equal to 0.05 and less than or equal to 0.3, and it is the most preferable if the lamination ratio H(−) is greater than or equal to 0.1 and less than or equal to 0.25. Furthermore, in the case of a three-layer construction of A/B/C, it is also preferable that {(the thickness of the A layer)+(the thickness of the C layer))/(the thickness of the entire film) be greater than or equal to 0.01 and less than or equal to 0.4. From the viewpoint of the film making characteristic, it is preferable that the laminate thicknesses of the A layer and the C layer be equivalent to each other. The foregoing laminate thickness ratio can be achieved by adjusting the discharge amounts at the time of extruding the polyester A that constitutes the A layer and the polyester B that constitutes the B layer. The discharge amount can be adjusted as appropriate by the screw rotation speed of the extruder, the rotation speed of a gear pump in the case where the gear pump is used, the extrusion temperature, the viscosity of the polyester raw material, etc. As for the lamination ratio of the film, the lamination ratio can be found by measuring the thicknesses of the individual layers through observation of a cross-section of the film at a magnification ratio of greater than or equal to 500 times and less than or equal to 10000 times under a scanning type electron microscope, a transmission type electron microscope, an optical microscope or the like.

From the point of view of the post-molding external appearance, the color tone b value is preferred to be greater than or equal to −1.5 and less than or equal to 1.5. When the color tone b value is smaller than −1.5, the look of a molding that uses the biaxially oriented polyester film becomes bluish, impairing the external appearance thereof. On the other hand, when the color tone b value is greater than 1.5, the look becomes yellowish, and the external appearance declines. More preferably, the color tone b value is greater than or equal to 0 and less than or equal to 1.5. It is the most preferable if the color tone b value is greater than or equal to 0 and less than or equal to 1.2. It is to be noted herein that as for the color tone b value, measurement of the b value in a Lab colorimetric system is a value found by a transmission measurement based on JIS Z-8722-2000. The method that makes the color tone b value greater than or equal to −1.5 and less than or equal to 1.5 is not particularly limited, but the resin temperature at the time of producing the biaxially oriented polyester film for molding is preferred to be controlled to 275° C. to 295° C. Since there are cases where the resin temperature at the time of extrusion becomes higher than the temperature of the extruder due to the shear heating of resin, there is a need for setting the temperature of the extruder on the basis of the kneading time of resin, the resin viscosity and the like. It is preferable to provide an atmosphere of an inert gas and, preferably, flowing nitrogen, inside the extruder and set the oxygen concentration inside the supply portion to less than or equal to 0.7 vol % and, more preferably, less than or equal to 0.5 vol %. The biaxially oriented polyester film is preferred to contain 1,4-cyclohexane dimethanol-derived structural unit and/or neopentyl glycol-derived structural unit, in order to achieve a moldability for a complicated shape over a wide temperature region. However, since there are cases where containing these components decreases the extrusion heat resistance, the oxygen concentration and the resin temperature at the time of extrusion are important. Furthermore, by adopting the extrusion temperature and the oxygen mentioned above, the color tone b value can be made greater than or equal to −1.5 and less than or equal to 1.5.

The thermal shrinkage ratios in the lengthwise direction and the widthwise direction at 150° C. are both preferred to be less than or equal to 1%, in order to improve the post-molding dimensional stability. Furthermore, to improve the post-molding dimensional stability, the thermal shrinkage ratios in the lengthwise direction and the widthwise direction at 150° C. are both preferred to be greater than or equal to −1%. Herein, the thermal shrinkage ratios in the lengthwise direction and the widthwise direction at 150° C. refer to rates of changes in the distance between gauge lines drawn at intervals of 100 mm on samples obtained by cutting the film in the lengthwise direction and widthwise direction out into rectangles of 150 mm in length×10 mm in width, the changes in the inter-gauge line distance occurring from before to after each sample was subjected to a heating treatment by placing it, with a weight of 3 g hung therefrom, in a hot-air oven heated at 150° C., for 30 minutes.

Setting the thermal shrinkage ratio at 150° C. in each of the lengthwise direction and the widthwise direction to greater than or equal to −1% or less than or equal to 1% makes it possible to restrain deformation or the like at the time of heating a molded member obtained after molding the film, or the like, and is therefore very preferable.

As a method that causes both the thermal shrinkage ratios in the lengthwise direction and the widthwise direction at 150° C. to be greater than or equal to −1% and less than or equal to 1%, there can be cited, for example, an off-line anneal treatment. That is, it is a method in which the polyester film that is once wound up is subjected to a heat treatment again.

The thermal shrinkage ratio at 150° C. in either one of the directions is more preferred to be less than or equal to 0.8%, and is most preferred to be less than or equal to 0.5%.

To improve the post-molding dimensional stability, it is preferable that the thermal deformation ratio of the film at 150° C. in at least one direction during a temperature rise from 25° C. to 220° C. at a temperature rise speed of 5° C./min, with a load of 19.6 mN, be 0 to +3%. Satisfying this characteristic will restrain the deformation of the film when the film, after being molded, is stored in a heated condition, for example, will prevent occurrence of a defect, such as warpage of an in-mold molding or insert mold, peeling of a film from resin (the post-molding dimensional stability can be evaluated by, for example, (19) POST-MOLDING DIMENSIONAL STABILITY 1 in the EXAMPLES).

To improve the post-molding dimensional stability, the off-line anneal treatment is very effective as mentioned above. It is possible to obtain the thermal deformation ratio in the width direction within the foregoing range by setting the off-line anneal treatment temperature to greater than or equal to 140° C. and less than 160° C. and obtaining a free state in the film widthwise direction, that is, a state in which the film is not constrained in the film width direction, and it is also possible to set the thermal deformation ratio in the lengthwise direction within the foregoing range by making the winding-up speed in the lengthwise direction lower than the winding-off speed by +0.5 to 5%. Further, providing stepwise cooling zones after the off-line anneal treatment will further reduce the thermal shrinkage ratio, and is therefore preferable. More preferably, the thermal deformation ratios of the film at 150° C. in the lengthwise direction and the widthwise direction during a temperature rise from 25° C. to 220° C. at a temperature rise speed of 5° C./min, with a load of 19.6 mN, are 0 to +2.5%. It is the most preferable if the thermal deformation ratios of the film at 150° C. in the lengthwise direction and the widthwise direction are +0.5 to +2%.

Furthermore, when the film is developed into a use in which the post-molding dimensional stability is particularly severe, it is preferable that the thermal deformation ratio of the film at 180° C. in at least one direction during a temperature rise from 25° C. to 220° C. at a temperature rise speed of 5° C./min, with a load of 19.6 mN, be 0 to +3%. Satisfying this characteristic will restrain the deformation of the film when the film, after being molded, is stored in a high-temperature heated condition, for example, will prevent occurrence of a defect, such as warpage of an in-mold molding or an insert mold, peeling of a film from resin (the post-molding dimensional stability can be evaluated by, for example, (20) POST-MOLDING DIMENSIONAL STABILITY 2 in the EXAMPLES).

To achieve the foregoing thermal deformation ratio, it is possible to obtain the thermal deformation ratio in the widthwise direction within the foregoing range by setting the off-line anneal treatment temperature to greater than or equal to 160° C. and less than 180° C. and obtaining a free state in the film widthwise direction, that is, a state in which the film is not constrained in the film widthwise direction, and it is also possible to set the thermal deformation ratio in the lengthwise direction within the foregoing range by making the winding-up speed in the lengthwise direction lower than the winding-off speed by +0.5 to 5%. Further, providing stepwise cooling zones after the off-line anneal treatment will further reduce the thermal shrinkage ratio, and therefore is preferable. More preferably, the thermal deformation ratios of the film at 180° C. in the lengthwise direction and the widthwise direction during a temperature rise from 25° C. to 220° C. at a temperature rise speed of 5° C./min, with a load of 19.6 mN, are 0 to +3%. It is the most preferable if the thermal deformation ratios of the film at 180° C. in the lengthwise direction and the widthwise direction are +0.5 to +2%.

Haze is preferred to be 3% from the point of view of the design characteristic of a post-molding molded member. Making the haze less than 3% will improve the design characteristic of the molded member, and therefore is preferable. More preferably, the haze is less than 2.5%. It would be most preferable if the haze is less than 2%.

As a method that makes the haze less than 3%, there can be cited a method in which the concentration of particles that are contained to improve the conveyability of the film is reduced as much as possible. A particle can be contained in the film to improve the conveyability of the film. Herein, the particle used is not particularly limited. However, external added particles are suitably used in the viewpoint of conveyability and external appearance. As external added particles, for example, wet and dry silica, colloidal silica, aluminum silicate, titanium oxide, calcium carbonate, calcium phosphate, barium sulfate, aluminum oxide and the like can be used, and as organic particles, particles having as a constituent component styrene, silicone, acrylic acids, methacrylic acids, polyesters, divinyl compound, etc. can be used. Among these, it is preferable to use a particle having an inorganic particle such as wet and dry silica or alumina, or styrene, silicone, acrylic acid, methacrylic acid, polyester, divinyl benzene, etc. as a constituent component. Further, as for these external additive particles, two or more species may be used in combination. From the viewpoint of conveyability and external appearance, it is preferable if the particle content in the film is 0.001 to 0.02 mass % relative to 100 mass % of the entire film, and it is further preferable if the particle content is 0.002 to 0.01 mass %.

As a method that reduces the particle concentration without decreasing the conveyability of the film, there can be cited, for example, a method in which the film is prepared as a laminate film of two or more layers including at least the A layer and the B layer, and a particle is added into only the A layer or the B layer. Adding particles into only the A layer or the B layer lessens the amount of particle added, and reduces the haze without deteriorating the handling characteristic. To further improve handling characteristic, a mode in which a three-layer construction, that is, an A layer/B layer/C layer construction, is prepared and particle is added into only the A layer and the C layer is very preferable.

Furthermore, as a method making the haze less than or equal to 3%, it is preferable to make the post-drawing heat treatment temperature lower than the crystal melting peak temperature (TmB) of the B layer by greater than or equal to 2° C.

From the viewpoint of a shape retaining characteristic and a depth property of a molded member, the film thickness is preferred to be greater than or equal to 25 and less than or equal to 500 μm, and it is more preferable if the film thickness is greater than or equal to 50 μm and less than or equal to 300 μm, and it is the most preferable if the film thickness is greater than or equal to 75 μm and less than or equal to 250 μm.

Next, concrete examples of a production method for the biaxially oriented polyester film will be described. However, this disclosure is not to be interpreted as being limited to such examples.

When the film is prepared as a laminate polyester film having the polyester A layer and the polyester B layer, a polyethylene terephthalate resin (a) and a 1,4-cyclohexane dimethanol copolymerized polyethylene terephthalate resin (b) are first measured at a predetermined proportion as a polyester A for use in the polyester A layer. Furthermore, as the polyester B for use in the polyester B layer, a polyethylene terephthalate resin (c) and a 1,4-cyclohexane dimethanol copolymerized polyethylene terephthalate resin (d) are measured at a predetermined proportion.

Then, the mixed polyester resin is supplied to a vent-type twin-screw extruder, and is melted and extruded. At this time, it is preferable to have a flowing-nitrogen atmosphere within the extruder, have the oxygen concentration at less than or equal to 0.7 vol %, and control the resin temperature to 265° C. to 295° C. Subsequently, via a filter and a gear pump, removal of foreign substances and equalization of the extrusion amounts are respectively performed, and then the resin is discharged from a T die into the form of a sheet on a cooling drum. At this time, a sheet-shape polymer is firmly stuck to a casting drum, and is cooled and solidified to form an undrawn film by an electrostatic application method in which electrodes to which high voltage has been applied are used to closely adhere the cooling drum and resin to each other by static electricity, a casting method in which a water film is provided between a casing drum and an extruded polymer sheet, a method in which the casting drum temperature is set below the glass transition point of the polyester resin (glass transition point −20° C.) so that extruded polymer becomes stuck to the polymer, or a method combining these methods. Among these casting methods, the method of electrostatic application is preferably used from the viewpoint of productivity and planarity in the case where polyester is used.

The film needs to be a biaxially oriented film, from the point of view of heat resistance and dimensional stability. The biaxially oriented film can be obtained by performing drawing by a sequential biaxial drawing method of drawing an undrawn film in the lengthwise direction and then drawing it in the widthwise direction, or drawing the film in the widthwise direction and then drawing it in the lengthwise direction, or a simultaneous biaxial drawing method of drawing the film in the lengthwise direction and the widthwise direction substantially simultaneously, or the like.

As the draw ratio in such a drawing method, there are adopted preferably greater than or equal to 3.5 times and 4.2 times in each of the lengthwise direction and the widthwise direction and, more preferably, greater than or equal to 3.5 times and less than or equal to 4.0 times, and, more preferably, greater than or equal to 3.5 times and less than or equal to 3.8 times. Furthermore, the drawing speed is desired to be greater than or equal to 1,000%/min and less than or equal to 200,000%/min. Furthermore, the drawing temperature is preferred to be greater than or equal to 70° C. and less than or equal to 90° C. in the lengthwise direction and greater than or equal to 80° C. and less than or equal to 110° C. Furthermore, drawing may be performed a plurality of times in each of the directions.

Further, after the biaxial drawing, a heat treatment of the film is performed. The heat treatment can be performed by an arbitrary method conventionally known, such as within an oven, on a heated roll and the like. This heat treatment is performed at a temperature greater than or equal to 120° C. and less than or equal to the crystal melting peak temperature of the polyester, and preferably at greater than or equal to 220° C. and less than or equal to 240° C., and more preferably at greater than or equal to 225° C. and less than or equal to 235° C. Furthermore, the heat treatment time may be arbitrary within such a range that the property will not be deteriorated, and it is appropriate to perform the heat treatment preferably in greater than or equal to 5 seconds and less than or equal to 60 seconds, and more preferably in greater than or equal to 10 seconds and less than or equal to 40 seconds, and most preferably in greater than or equal to 15 seconds and less than or equal to 30 seconds. Further, the heat treatment may be performed while the film is loosened in the lengthwise direction and/or the widthwise direction. Further, to improve the adhesion force with various processing layers such as a print layer, an adhesion layer, a vapor deposition layer, a hard coat layer and a weather-resistant layer, it is possible to coat an easy adhesion layer or perform a corona treatment on at least one surface. As a method that provides a coating layer in a line within a film production step, a method in which a dispersion of a coating layer composition in water is uniformly applied onto a film that has been subjected at least to a uniaxial drawing, by using a metering ring bar, a gravure roll or the like, and in which the applied agent is dried while the drawing is performed on the film is preferable. At this time, the easy adhesion layer thickness is preferred to be greater than or equal to 0.01 µm and less than or equal to 1 µm. Furthermore, it is permissible to add into the easy adhesion layer various additives, for example, an antioxidant, a heat-resistant stabilizer, an ultraviolet absorber, an infrared absorber, a pigment, a die, an organic or inorganic particle, an antistatic agent, a nucleating agent or the like. A resin that is preferably used in the easy adhesion layer is preferred to be at least one species of resin selected from an acrylic resin, a polyester resin and a urethane resin, from the viewpoint of adhesion property and handling characteristic. Further, to improve the post-molding dimensional stability, it is preferable to perform off-line anneal under the condition of 140 to 180° C.

The biaxially oriented polyester film is preferred to contain an antioxidant, from the viewpoint of the quality level of the film. Containing an antioxidant will restrain oxidative decomposition in an extrusion step and a drying step of the polyester resin, and prevent the decline in quality level due to a gel-state foreign matter. The kind of the antioxidant is not particularly limited; for example, antioxidants classified into hindered phenols, hydrazines, phosphites, etc. can be suitably used. Among these, pentaerythrityl-tetrakis[3-(3,5-di-t-butyl-4-hydroxyphenyl)propionate], 3,5-di-t-butyl-4-hydroxy-benzylphosphonate-diethyl ester, 1,3,5-trimethyl-2,4,6-tris(3,5-di-t-butyl-4-hydroxy benzyl)benzene, tris(2,4-di-t-butylphenyl)phosphite, etc. are preferably used.

Furthermore, the biaxially oriented polyester film can be provided with weather resistance in the case where it is used outdoors. As a method that provides weather resistance, there can be cited a method in which a weather-resistant layer is laminated. The weather-resistant layer is a layer that has at least functions of absorbing light energy whose wavelength is greater than or equal to 350 nm and less than or equal to 360 nm, radiating harmless thermal energy, phosphorescence and fluorescence due to very rapid energy conversion, restraining photochemical reactions and photo-excitation of impurities in polymer, and preventing whitening, embrittlement, cracking, yellowing and the like, and is composed of, for example, a weather resistance resin layer, a layer obtained by containing an ultraviolet absorber in any one of various resin layers and the like. In particular, the average transmittance of the film for a range of wavelength greater than or equal to 350 nm and less than or equal to 360 nm is preferred to be less than or equal to 45%, and preferably less than or equal to 30%, and more preferably less than or equal to 10%. A preferable range of thickness of the weather-resistant layer is greater than or equal to 0.5 µm and less than or equal to 20 µm. It is more preferable if the range of thickness thereof is greater than or equal to 1 µm and less than or equal to 15 µm, and it is the most preferable if the range of thickness is greater than or equal to 2 µm and less than or equal to 10 µm. A method in which a weather-resistant agent is added can also be cited. Where a weather-resistant agent is added, it is also preferable that the average transmittance of the film with the added weather-resistant agent for a range of wavelength greater than or equal to 350 nm and less than or equal to 360 nm be less than or equal to 45%, and preferably less than or equal to 30%, and more preferably less than or equal to 10%. The weather-resistant agent used is not particularly limited; however, benzophenone-based compounds, triazine-based compounds, benzotriazole-based compounds, salicylic acid-based compounds, salicylate-based compounds, cyanoacrylate-based compounds, nickel-based compounds, benzoxazinone-based compounds, cyclic iminoester-based compounds and the like can be preferably used. Among these, benzotriazole-based compounds, benzophenone-based compounds and benzoxazinone-based compounds are preferably used, and, from the viewpoint of dispersibility, benzoxazinone-based compounds in particular are preferably used. These compounds can be used alone in one species or in combination of two or more species. Further, a stabilizing agent, such as HALS (Hindered Amine Light Stabilizer), an antioxidant, etc. can be used as well; particularly, it is preferable to use a phosphorus-based antioxidant as well.

Herein, as the benzotriazole-based compounds, there can be cited, for example, 2-2H-benzotriazole-2-yl)-4,6-bis(1-methyl-1-phenyl ethyl) phenol, 2-(2H-benzotriazole-2-yl)-4-(1,1,3,3-tetramethylbutyl)phenol, 2-(2H-benzotriazole-2-yl)-4-methylphenol, 2-(2H-benzotriazole-2-yl)-4,6-di-t-butylphenol, 2-(2H-benzotriazole-2-yl)-4,6-di-t-amylphenol, 2-(2H-benzotriazole-2-yl)-4-t-butylphenol, 2-(2'-hydroxy-3'-t-butyl-5'-methylphenyl)-5-chlorobenzotriazole, 2-(2'-hydroxy-3',5'-di-t-butylphenyl)-5-chlorobenzotriazole and the like. As the benzophenone-based compounds, there can be cited, for example, 2-hydroxy-4-octoxybenzophenone, 2-hydroxy-4-methoxy benzophenone, 2,2'-dihydroxy-4,4'-dimethoxy benzophenone, 2,2',4,4'-tetrahydroxy benzophenone, 2,4-dihydroxy benzophenone, 2-hydroxy-4-methoxy benzophenone-5-sulfonic acid, etc. As the benzoxazinone-based compounds, there can be cited, for example, 2-p-nitrophenyl-3,1-benzoxazine-4-one, 2-(p-benzoylphenyl)-3,1-benzoxazine-4-one, 2-(2-naphthyl)-3,1-benzoxazine-4-one, 2,2'-p-phenylenebis (3,1-benzoxazine-4-one), 2,2'-(2,6-naphthylene)bis(3,1-benzoxazine-4-one), etc. In respect of providing a further excellent weather resistance, it is preferable to use a cyanoacrylate-based tetramer compound with another ultraviolet absorber. In this case, the cyanoacrylate-based tetramer compound is preferred to be contained in an amount of 0.05 to 2 wt % and, more preferably, 0.1 to 1.0 wt %. The cyanoacrylate-based tetramer compounds are compounds whose basic structure is a tetramer of cyanoacrylate, for example, 1,3bis(2'cyano-3,3-diphenylacryloyloxy)-2,2-bis-(2'cyano-3,3-diphenylacryloyl oxymethylpropane). Herein, as an ultraviolet absorber that is used with a cyanoacrylate, a benzoxazinone-based compound, particularly, 2,2'-(1,4-phenylene)bis(4H-3,1-benzoxazine-4-one), is preferable, and the amount thereof to be added is preferred to be 0.3 to 1.5 wt % in the film.

Furthermore, when the biaxially oriented polyester film is used in a use where the scratch resistance is particularly severe, a hard coat layer can be laminated. As for the hard coat layer, it suffices that the layer is high in hardness and excellent in scratch resistance and abrasion resistance. The hard coat layer can be constructed of acryl-based, urethane-based, melamine-based or organic silicate compounds, silicone-based or metal oxides or the like. In particular, in respect of hardness and durability and, further, hardenability and productivity, a hard coat layer made up of an acryl-based composition and, particularly, an actinic ray-setting type acryl-based composition, or a thermosetting type acryl-based composition, is preferably used. Furthermore, the pencil hardness of the film after the hard coat layer is laminated is preferred to be higher than or equal to HB, and more preferably higher than or equal to H, and it is the most preferable if the pencil hardness is higher than or equal to 2H.

Furthermore, when the biaxially oriented polyester film is used in metallic decoration, it is preferable that a metal compound be vapor-deposited on at least one surface of the film before the film is used. If the film in use is provided with a vapor-deposited metal compound, the external appearance of the film becomes metallic, and the film can be used as an alternative to a molded component part for which a plated resin is currently used. Among such, it is preferable that the film be provided with vapor deposit of a metal compound whose melting point is greater than or equal to 150° C. and less than or equal to 400° C., and then be used. Using a metal whose melting point is in such a range makes it possible to form a vapor-deposited metal layer in a temperature range where the polyester film can be molded, and leads to easier restraint of occurrence of defect in vapor-deposited layer during molding, and is therefore preferable. A particularly preferable melting point of the metal compound is greater than or equal to 150° C. and less than or equal to 300° C. The compounds whose melting point is greater than or equal to 150° C. and less than or equal to 400° C. are not particularly limited. However, indium (157° C.) and tin (232° C.) are preferable, and, particularly, in respect of metallic luster and color tone, indium can be preferably used. Furthermore, as a manufacturing method for a vapor-deposited thin film, it is possible to use a vacuum evaporation method, an EB deposition method, a sputtering method, an ion plating method, etc. Incidentally, to further improve the adhesion property between the polyester film and the vapor-deposited layer, the surface of the film may be pre-treated by a method, such as a corona discharge treatment or a method in which an anchor coat agent is applied, or the like. Furthermore, as for the thickness of the vapor-deposited film, it is preferable if the thickness is greater than or equal to 1 nm and less than or equal to 500 nm, and it is more preferable if the thickness is greater than or equal to 3 nm and less than or equal to 300 nm. From the viewpoint of productivity, the thickness is preferred to be greater than or equal to 3 nm and less than or equal to 200 nm.

Furthermore, the biaxially oriented polyester film, in the case of being used on a surface of a molded member by printing, can give an external appearance and design characteristic. The printing method is not particularly limited. However, gravure printing, offset printing, screen printing, etc. are preferably used. Furthermore, the thickness of the printed layer is preferably greater than or equal to 1 nm and less than or equal to 20 μm.

The biaxially oriented polyester film is preferably used for use for decorating a molded member, and is preferably used for use for in-mold forming and use for insert forming as molding decorating methods. The in-mold forming mentioned herein is a forming method in which the film itself is placed in a die, and is formed into a desired shape by the pressure of resin injected to obtain a formed decorated body. Furthermore, the insert forming is a forming method in which a film molding placed in a die is created by vacuum molding, air-pressure molding, vacuum air-pressure molding, press molding, plug assist molding and the like, and resin is charged into the shape of the film to obtain a formed decorated body. Because of being capable of producing more complicated shapes, the biaxially oriented polyester film is used particularly preferably in insert forming use.

The biaxially oriented polyester film is capable of being thermally shaped at low temperature of 100° C. to 150° C. because the storage elastic modulus thereof at 100° C. is low and the molding stress at 150° C. is low, and is also capable of restraining the decline in quality level at the time of molding even in a molding method that needs high-temperature molding because the storage elastic modulus at 180° C. is in a specific range. Therefore, the film can be suitably used for decoration of molded members such as building materials, mobile appliances, electrical machinery products, automotive component parts, amusement machine component parts, etc.

EXAMPLES (1) Crystal Melting Peak Temperature, Small Endothermic Peak Temperature (Tmeta) Prior to Crystal Melting, and Temperature-Rise Crystallization Temperature (Tcc)

Using a differential scanning calorimeter (made by SEICO Electronics Industrial, RDC220), measurement and analysis were performed according to JIS K7121-1987 and JIS K7122-1987. Using 5 mg of a polyester layer or a polyester film as a sample, the temperature at the summit of an endothermic peak obtained on a DSC curve for a temperature rise from 25° C. to 300° C. at 20° C./min in the 1st run was determined as a crystal melting peak temperature of the 1st run. When there were a plurality of crystal melting peaks, the temperature at which the absolute value of heat flow was the greatest was determined as a crystal melting peak temperature. Furthermore, a small endothermic peak temperature appearing prior to the crystal melting peak was read as Tmeta. Furthermore, after the 1st run ended, each sample was held at 300° C. for 5 minutes, and then was rapidly cooled to 25° so that an amorphous state was obtained. After 5 minutes at 25° C., the temperature of the summit of an exothermic peak temperature during raise of temperature from 25° C. to 300° C. at 20° C./min in the 2nd run was determined as the temperature-rise crystallization temperature (Tcc) of the 2nd run, and the temperature of the summit of an endothermic peak was determined as the crystal melting peak temperature of the 2nd run. When there were a plurality of temperature-rise crystallization peaks and crystal melting peaks, the temperatures at which the absolute value of heat flow was the greatest were determined as the temperature-rise crystallization peak temperature and the crystal melting peak temperature, respectively. Incidentally, as for evaluation of the A layer and the B layer of the laminate film, the thickness of each layer was measured, and measurement was performed by shaving individual sites.

(2) Intrinsic Viscosity of Polyester

The limiting viscosities of the polyester resin and the film were measured 25° C. through the use of an Ostwald viscometer after the polyester was dissolved in orthochlorophenol.

(3) Composition of Polyester

After the polyester resin and the film were dissolved in hexafluoroisopropanol (HFIP), contents of individual monomer residue components and by-product diethylene glycol can be quantified by using $^1$H-NMR and $^{13}$C-NMR. In the case of a laminate film, the components that constitutes each layer alone can be collected and evaluated by shaving each layer of the film according to the laminate thickness. Incidentally, the composition was determined by calculation based on the mixture proportions at the time of production of the film.

(4) Concentration of Particle Contained in Film

Whether the film contains particle can be evaluated by dissolving 10 g of the polyester film in 100 g of orthochlorophenol, and centrifugally separating particle from polyester. Furthermore, the particle concentration can be found as below.

(Particle concentration)=(mass of particle)/(mass of the entire film)×100

Incidentally, the particle concentration was determined by calculation based on the particle concentration in a particle master manufactured by adding particle at the time of polymerization and the concentration of the particle master in the film.

(5) Haze

Measurement of film haze was performed through the use of a haze meter (HGM-2GP made by Suga Test Instruments Co., Ltd.) on the basis of JIS K 7105 (1985). Measurements were carried out at arbitrary three points, and an average value thereof was adopted.

(6) Film Thickness, and Layer Thickness

The film was embedded in epoxy resin, and film sections were cut out by a microtome. The sections were observed under a transmission type electron microscope (TEM H7100 made by Hitachi, Ltd.) at a magnification of 5000 times to find the film thickness and the thickness of the polyester layer.

(7) Stress (F100 Value) at the Time of 100% Elongation at 150° C.

Samples of obtained by cutting the film in the lengthwise direction and the widthwise direction out into rectangles of 150 mm in length×10 mm in width. A tensile test was performed in each of the lengthwise direction and the widthwise direction of the film through the use of a tensile tester (Tensilon UCT-100 made by ORIENTEC), with an initial inter-tension chuck distance of 50 mm, at a tension speed of 300 mm/min. As for the measurement, a film sample was set in a constant temperature oven set at 150° C., and the tensile test was performed after pre-heating for 90 seconds. The load acting on the film when the sample underwent 100% elongation (when the inter-chuck distance became 100 mm) was read, and the value obtained by dividing the read value by the sectional area of the specimen (film thickness×10 mm) prior to the test was determined as the stress (F100 value) at the time of 100% elongation. Incidentally, measurement was performed 5 times in each direction for each sample, and average values thus obtained were used to carry out evaluation.

(8) Breaking Elongation Degree at 150° C.

The tensile test was performed on each film in each of the lengthwise direction and the widthwise direction by substantially the same method as in (7), and the elongation degree when the film broke was determined as the elongation degree thereof. Incidentally, measurement was performed 5 times in each direction for each sample, and average values thereof were used to carry out evaluation.

(9) Storage Viscoelastic Modulus

Samples were made by cutting each film in the lengthwise direction and the widthwise direction out into rectangles of 60 mm in length×5 mm in width. Using a dynamic viscoelasticity measurement device (DMS6100 made by Seiko Instruments), storage elastic moduli (E') at 100° C. and 180° C. were found under the conditions mentioned below. Frequency: 10 Hz, test length: 20 mm, minimum load: about 100 mN, amplitude: 10 μm, measurement temperature range: −50° C. to 200° C., temperature rise speed: 5° C./min.

(10) Thermal Shrinkage Ratio

Samples were made by cutting each film in the lengthwise direction and the widthwise direction out into rectangles of 150 mm in length×10 mm in width, respectively. Gauge lines were drawn at intervals of 100 mm on each sample, and each sample was subjected to a heating treatment by placing it, with a weight of 3 g hung therefrom, in a hot-air oven heated at 150° C., for 30 minutes. The inter-gauge line distance subsequent to the heat treatment was measured, and a thermal shrinkage ratio was determined from the change in the inter-gauge line distance occurring from before to after the heating treatment, as in the below-mentioned expression. Measurement was performed, for each film, on five samples in the lengthwise direction and the widthwise direction, and average values were used to carry out evaluation.

Thermal shrinkage ratio(%)={(inter-gauge line distance before heating treatment)−(inter-gauge line distance after heating treatment)}/(inter-gauge line distance before heating treatment)×100.

(11) Thermal Deformation Ratio

Samples was made by cutting each film in the lengthwise direction and the widthwise direction out into rectangles of 50 mm in length×4 mm in width. The rate of change in the film length occurring at temperatures during a temperature raise under the below-mentioned conditions through the use of a thermo-mechanical analysis device (TMA EXSTAR6000 made by Seiko Instruments) was determined as a thermal deformation ratio.

Test length: 15 mm, load: 19.6 mN, temperature rise speed: 5° C./min, measurement temperature range: 25 to 220° C.

Thermal deformation ratio(%)=[{film length at target temperature (mm)−test length (mm)}/test length (mm)]×100

(12) b Value

The b value of each film was measured by a transmission method by using a spectral type color difference meter (SE-2000 made by NIPPON DENSHOKU INDUSTRIES, the light source being a halogen lamp, 12V4A, 0° to −45° rear spectral type) on the basis of JIS Z 8722 (2000).

(13) Moldability 1

Each polyester film was heated so that the surface temperature became 120° C. by using a far-infrared radiation heater of 450° C., and vacuum/air-pressure molding (air pressure: 0.2 MPa) was performed along a rectangular die (65×65 mm, 30 mm in height) heated to 60° C. As for the rectangular dies, two kinds of dies of which the R's of edge portions are 2 mm and 3 mm, respectively, were prepared to perform the vacuum/air-pressure molding. The molded states along the dies were evaluated by the references as follows.

A: Molding was able to be accomplished with the R's being 2 mm (the R's of 2 mm were able to be reproduced).

B: Molding was able to be accomplished with the R's being 3 mm (the R's of 3 mm were able to be reproduced), but the R's of 2 mm were not able to be accomplished.

C: Molding was not able to be accomplished with the R's being 3 mm.

(14) Moldability 2

Each polyester film was heated so that the surface temperature became 150° C. by using a far-infrared radiation heater of 450° C., and vacuum/air-pressure molding (air pressure: 0.2 MPa) was performed along a rectangular die (65×65 mm, 30 mm in height) heated to 60° C. As for the rectangular dies, two kinds of dies of which the R's of edge portions are 2 mm and 3 mm, respectively, were prepared to perform the vacuum/air-pressure molding. The molded states along the dies were evaluated by the references as follows.

A: Molding was able to be accomplished with the R's being 2 mm (the R's of 2 mm were able to be reproduced).

B: Molding was able to be accomplished with the R's being 3 mm (the R's of 3 mm were able to be reproduced), but the R's of 2 mm were not able to be accomplished.

C: Molding was not able to be accomplished with the R's being 3 mm.

(15) Moldability 3

Each polyester film was heated so that the surface temperature became 190° C. by using a far-infrared radiation heater of 450° C., and vacuum/air-pressure molding (air pressure: 0.2 MPa) was performed along a rectangular die (70×70 mm, 30 mm in height) heated to 60° C. As for the rectangular dies, two kinds of dies of which the R's of edge portions were 2 mm and 3 mm, respectively, were prepared to perform the vacuum/air-pressure molding. The molded states along the dies were evaluated by the references as follows.

A: Molding was able to be accomplished with the R's being 2 mm (the R's of 2 mm were able to be reproduced).

B: Molding was able to be accomplished with the R's being 3 mm (the R's of 3 mm were able to be reproduced), but the R's of 2 mm were not able to be accomplished.

C: Molding was not able to be accomplished with the R's being 3 mm.

D1: The film surface after being molded was seen with a slight roughness, but it was at the level that was not problematic.

D2: The film surface after being molded was seen with a roughness.

Incidentally, it is a precondition for A to C that the film surface after being molded has not been subjected to occurrence of roughness, and D1 and D2 include cases where molding with a radius of 2 mm or a radius of 3 mm was able to be accomplished. If the state is A, B or D1, the state is at a pass level.

(16) Moldability 4

Each polyester film was heated so that the surface temperature became 100° C. by using a far-infrared radiation heater of 300° C., and ultrahigh pressure molding (air pressure: 8 MPa) was performed along a rectangular die (65×65 mm, 30 mm in height) heated to 60° C. As for the rectangular dies, the dies of which the R's of edge portions were 2 mm were prepared to perform molding. Results of molding were evaluated by the references as follows.

A: Neither whitening nor breakage occurred on the film.

B: Breakage of the film did not occur, but there were whitened sites.

C: The film broke.

(17) Film External Appearance

The screen printing was performed on film surfaces. Printing was performed by using a screen SX270T and an ink U-PET(517) made by MINO GROUP (K.K.), in the conditions of a squeegee speed of 300 mm/sec and a squeegee angle of 45°, and subsequently drying was performed for 15 minutes in a hot air oven in the condition of 65° C. to obtain printed layer-laminated films. With regard to the obtained printed layer-laminated films, evaluation was performed by the below-mentioned references regarding the external appearance of each film from the opposite surface to the printed layer.

A: The print was clear, and an external appearance excellent in design characteristic was obtained.

B: An external appearance with the print being slightly yellow resulted.

C: An external appearance with the print being slightly whitish resulted.

(18) Dimensional Stability

With regard to printed layer-laminated films obtained by performing screen printing and drying in substantially the same conditions as in (17), evaluation was performed by the below-mentioned references regarding the film surface that was the opposite surface to the printed layer.

A: No roughness or undulation was seen at all on the film surface, and the film surface was excellent in surface characteristic.

B: Although undulation was seen on the film surface, the surface characteristic was at a level without problem.

C: Roughness occurred on the film surface, and the surface characteristic was inferior.

(19) Post-Molding Dimensional Stability 1

The moldings molded in (15) are set in injection molding dies, and PC/ABS resin (SD POLYCA IM6011) made by Sumitomo Dow (K.K.) was injected and molded at a molding temperature of 260° C., whereby insert molding was performed. The obtained moldings were subjected to a heat resistance test of 70° C.×10 h, and evaluation was performed by the below-mentioned references.

A: No change was seen at all about the shape of the molding.

B: The molding warped toward the film side, but at a level with practically no problem.

C: The molding warped toward the film side, and the peeling of the film from an end portion of the molding occurred.

(20) Post-Molding Dimensional Stability 2

The moldings molded in (15) are set in injection molding dies, and PC/ABS resin (SD POLYCA IM6011) made by Sumitomo Dow (K.K.) was injected and molded at a molding temperature of 260° C., whereby insert molding was performed. The obtained moldings were subjected to a heat resistance test of 80° C.×10 h, and evaluation was performed by the below-mentioned references.
A: No change was seen at all about the shape of the molding.
B: The molding warped toward the film side, but at a level with practically no problem.
C: The molding warped toward the film side, and the peeling of the film from an end portion of the molding occurred.

(21) Scratch Resistance

A4-size samples were taken from the films. A hard coat agent "SHIKOH UV-7640B" made by Nippon Synthetic Chemical Industry (K.K.) and ethyl acetate were mixed at a mass ratio of 1:1, and the mixture was uniformly applied to the samples via a #4 metering bar. After the application, the samples were stored for 3 minutes in a hot air oven at 60° C., UV irradiation was performed by a UV irradiation device (ECS-401GX made by EYE GRAPHICS) so that the cumulative amount of light became 450 mJ/cm$^2$. The surface of each hard coat-laminated film obtained was rubbed with a steel wool #0000 by moving it back and forth five times (10 cm/s in speed) with a constant load, and the load was varied, and the maximum load that did not produce scratch was measured. Evaluation was performed by the references as follows.
A: The maximum load was greater than or equal to 1 kg/cm$^2$.
B: The maximum load was greater than or equal to 0.5 and less than 1 kg/cm$^2$.
C: The maximum load was less than 0.5 kg/cm$^2$.

(22) Weather Resistance Test

Using a ultraviolet ray degradation acceleration tester EYE SUPER UV TESTER SUV-W131 (made by Iwasaki Electric), a forced ultraviolet ray irradiation test was performed in the below-mentioned conditions.
Illuminance: 100 mW/cm$^2$, temperature: 60° C., relative humidity: 50% RH, irradiation time: 6 hours
Before and after the weather resistance test, the b values of the films were measured by a transmission method according to JIS-K-7105, by using a spectral type color difference meter SE-2000 (made by NIPPON DENSHOKU INDUSTRIES). On the basis of the amount of change in the b value, evaluation was performed by the references as follows.
A: Δb value was less than 4.
B: Δb value was greater than or equal to 4.

(23) Inter-Layer Adhesion Property

A tensile test was performed on each film five times in each of the lengthwise direction and the widthwise direction in substantially the same method as in (7). When a film broke, an OPP adhesive tape (Dumplon Ace No. 375) made by NITTO DENKO (K.K.) was stuck to each of the two surfaces of the site of breakage to create a construction of OPP adhesive tape/post-tensile test film sample/OPP adhesive e tape. The Dumplon tape was subjected to forced 180° pealing to observe the film sample after the tensile test. Evaluation was performed by the below-mentioned references.
A: Inter-layer peeling did not occur at all.
B: The peeling between the A layer/B layer occurred at least once.

(Production of Polyesters)
The polyester resins used for forming the films were prepared as follows.
(Polyester A)
A polyethylene terephthalate resin (intrinsic viscosity 0.65) of which a terephthalic component is 100 mol % as a dicarboxylic acid component and an ethylene glycol component is 100 mol % as a glycol component.
(Polyester B)
A copolymerized polyester (GN001 made by Eastman Chemical Company) in which 1,4-cyclohexane dimethanol was copolymerized with a glycol component, in an amount of 33 mol %, was used as a cyclohexane dimethanol copolymerized polyethylene terephthalate (intrinsic viscosity of 0.75)
(Polyester C)
A neopentyl glycol copolymerized polyethylene terephthalate resin (intrinsic viscosity of 0.75) of which a terephthalic component was 100 mol % as a dicarboxylic acid component and an ethylene glycol component was 70 mol % and a neopentyl glycol component was 30 mol % as glycol components.
(Polyester D)
An isophthalic acid copolymerized polyethylene terephthalate resin (intrinsic viscosity of 0.7) of which a terephthalic component was 82.5 mol % and an isophthalic component was 17.5 mol % as dicarboxylic acid components, and an ethylene glycol component was 100 mol % as a glycol component.
(Particle Master)
A polyethylene terephthalate particle master (intrinsic viscosity of 0.65) containing in the polyester A aggregate silica particles of 2.2 μm in number average particle diameter in an amount of 2 mass % in terms of particle concentration.
(Weather-Resistant Agent Master)
The polyester A created as mentioned above and 2,2'-(1,4-phenylene)bis(4H-3,1-benzoxazine-4-one) were mixed at a mass ratio of 95:5. Using a vent-type twin-screw extruder, the mixture was kneaded at 280° C. to manufacture a weather-resistant agent master of 2,2'-(1,4-phenylene)bis(4H-3,1-benzoxazine-4-one).

Example 1

A three-layer laminated film of A/B/A was made. With the composition of each layer being as in the table, the raw material for the A layer and the raw material for the B layer are supplied to separate vent same-direction twin-screw extruders with their respective oxygen concentrations being 0.2 vol %. Melting was carried, with the A layer extruder cylinder temperature being 270° C. and the B layer extruder cylinder temperature being 277° C. With the short-pipe temperature subsequent to confluence of the A layer and the B layer being 277° C. and the mouthpiece temperature being 280° C., the melt was discharged from a T die into a sheet shape on a cooling drum whose temperature was controlled to 25° C. At that time, wire-shaped electrodes of 0.1 mm in diameter were used to apply static electricity so that the sheet was closely attached to the cooling drum, whereby a three-layer laminated undrawn film made up of A layer/B layer/A layer was obtained. Subsequently, the film temperature was raised by a heating roll before being drawn in the lengthwise direction. With the pre-heating temperature being 80° C. and the drawing temperature being 85° C., the film was drawn to 3.6 times in the lengthwise direction, and was immediately cooled by a metal roll whose temperature was controlled to 40° C.

After that, the corona discharge treatment was performed. The wetting tensions of the both surfaces of the substrate film were set to 55 mN/m, paint agents A, B, C and D mentioned below were mixed while being ultrasonically dispersed and the mixture was uniformly applied via a #4 metering bar.

Polyester resin made up of a copolymerized composition of terephthalic acid/isophthalic acid/trimellitic acid/sebacic acid/ethylene glycol/neopentyl glycol/1,4-butanediol=28/9/10/3/15/18/17 mol %:6.0 mass %
Melamine crosslinking agent: 0.3 mass %
Colloidal silica particle (average particle diameter: 80 nm): 0.06 mass %
Butyl cellosolve: 1.36 mass %
Water: 92.28 mass %

Subsequently, via a tenter type lateral drawing machine, the film was drawn to 3.8 times in the widthwise direction at a pre-heating temperature of 85° C. and a drawing temperature of 95° C. The film was subsequently subjected to a heat treatment at 234° C. for seconds within the tenter. After that, a treatment at 150° C. was performed for 3 seconds while the film was relaxed 5% in the widthwise direction. Thus, a biaxially oriented polyester film of 188 μm in film thickness was obtained.

Example 2

The film of Example 1 was subjected to an off-line anneal treatment in a hot-air oven at 150° C. while the film was free in the width direction (in a state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 3

The film of Example 1 was subjected to the off-line anneal treatment in a hot-air oven at 180° C. while the film was free in the widthwise direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 4

A biaxially oriented polyester film of 188 μm in film thickness was obtained in substantially the same manner as in Example 1, except that the composition of the A layer was changed as in the table.

Example 5

The film of Example 4 was subjected to the off-line anneal treatment in a hot-air oven at 150° C. while the film was free in the widthwise direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 6

The film of Example 4 was subjected to the off-line anneal treatment in a hot-air oven at 180° C. while the film was free in the widthwise direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 7

A biaxially oriented polyester film of 188 μm in film thickness was obtained in substantially the same manner as in Example 1, except that the composition of the A layer was changed as in the table.

Example 8

The film of Example 7 was subjected to the off-line anneal treatment in a hot-air oven at 180° C. while the film was free in the width direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 9

A biaxially oriented polyester film of 188 μm in film thickness was obtained in substantially the same manner as in Example 1, except that the composition of the A layer was changed as in the table.

Example 10

The film of Example 9 was subjected to the off-line anneal treatment in a hot-air oven at 180° C. while the film was free in the widthwise direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 11

A biaxially oriented polyester film of 188 μm in film thickness was obtained in substantially the same manner as in Example 1, except that the composition of the A layer was changed as in the table.

Example 12

The film of Example 11 was subjected to the off-line anneal treatment in a hot-air oven at 180° C. while the film was free in the widthwise direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 13

A biaxially oriented polyester film of 188 μm in film thickness was obtained in substantially the same manner as in Example 7, except that the composition of the B layer was changed as in the table.

Example 14

The film of Example 13 was subjected to the off-line anneal treatment in a hot-air oven at 180° C. while the film was free in the widthwise direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 15

A biaxially oriented polyester film of 188 μm in film thickness was obtained in substantially the same manner as in Example 7, except that the composition of the B layer was changed as in the table.

Example 16

The film of Example 15 was subjected to the off-line anneal treatment in a hot-air oven at 180° C. while the film was free in the widthwise direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 17

A biaxially oriented polyester film of 188 μm in film thickness was obtained in substantially the same manner as in Example 7, except that the composition of the B layer was changed as in the table.

Example 18

The film of Example 17 was subjected to the off-line anneal treatment in a hot-air oven at 180° C. while the film was free in the widthwise direction (in the state where the film was not constrained in the film widthwise direction) and the winding-up speed in the lengthwise direction was reduced 1.5% from the winding-off speed. Thus, a biaxially oriented polyester film of 188 μm in film thickness was obtained.

Example 19

A biaxially oriented polyester film of 188 μm in film thickness was obtained in substantially the same manner as in Example 6, except that the lamination ratio was changed as in the table.

Example 20

A biaxially oriented polyester film of 188 μm in film thickness was obtained in substantially the same manner as in Example 6, except that the lamination ratio was changed as in the table.

Example 21

A biaxially oriented polyester film of 188 μm in film thickness was obtained in substantially the same manner as in Example 6, except that the A layer extruder and the B layer extruder were single-screw extruders.

Example 22

A biaxially oriented polyester film of 188 μm in film thickness was obtained in substantially the same manner as in Example 6, except that the melting was performed with the A layer extruder cylinder temperature being 275° C. and the B layer extruder cylinder temperature being 275° C., and that the short-pipe temperature subsequent to confluence of the A layer and the B layer was 275° C. and the mouthpiece temperature was 275° C.

Example 23

A biaxially oriented polyester film of 100 μm in film thickness was obtained in substantially the same manner as in Example 1, except that the thickness was changed.

Example 24

A biaxially oriented polyester film of 188 μm in film thickness was obtained in substantially the same manner as in Example 1, except that the compositions of the A layer and the B layer were changed as in the table.

Example 25

A biaxially oriented polyester film of 188 μm in film thickness was obtained in substantially the same manner as in Example 4, except that the heat treatment temperature subsequent to the drawing in the widthwise direction was changed to 205° C.

Example 26

A biaxially oriented polyester film of 188 μm in film thickness was obtained in substantially the same manner as in Example 4, except that the heat treatment temperature subsequent to the drawing in the widthwise direction was changed to 239° C.

Example 27

A biaxially oriented polyester film of 188 μm in film thickness was obtained in substantially the same manner as in Example 3, except that the compositions of the A layer and the B layer were changed as in the table.

Example 28

A biaxially oriented polyester film of 188 μm in film thickness was obtained in substantially the same manner as in Example 8, except that the oxygen concentration of each extruder was 1 vol %.

Comparative Example 1

A biaxially oriented polyester film of 188 μm in film thickness was obtained in substantially the same manner as in Example 1, except that the compositions of the A layer and the B layer were changed as in the table.

Comparative Example 2

A biaxially oriented polyester film of 188 μm in film thickness was obtained in substantially the same manner as in Example 1, except that a single-film construction was adopted, the composition was changed as in the table, and the heat treatment temperature subsequent to the drawing in the widthwise direction was 220° C.

Comparative Example 3

A biaxially oriented polyester film of 188 μm in film thickness was obtained in substantially the same manner as in Example 1, except that a single-film construction was adopted and the composition was changed as in the table.

Example 29

A biaxially oriented polyester film of 188 μm in film thickness was obtained in substantially the same manner as in Example 1, except that the compositions of the A layer and the B layer were changed as in the table.

Example 30

A biaxially oriented polyester film of 188 μm in film thickness was obtained in substantially the same manner as in Example 2, except that the compositions of the A layer and the B layer were changed as in the table.

Example 31

A biaxially oriented polyester film of 188 μm in film thickness was obtained in substantially the same manner as in Example 3, except that the compositions of the A layer and the B layer were changed as in the table.

Example 32

A biaxially oriented polyester film of 188 μm in film thickness was obtained in substantially the same manner as in Example 1, except that the compositions of the A layer and the B layer were changed as in the table.

Example 33

A biaxially oriented polyester film of 188 μm in film thickness was obtained in substantially the same manner as in Example 1, except that the compositions of the A layer and the B layer were changed as in the table.

Example 34

A biaxially oriented polyester film of 188 μm in film thickness was obtained in substantially the same manner as in Example 3, except that the compositions of the A layer and the B layer were changed as in the table.

Example 35

A biaxially oriented polyester film of 188 μm in film thickness was obtained in substantially the same manner as in Example 1, except that the compositions of the A layer and the B layer were changed as in the table.

Example 36

A biaxially oriented polyester film of 188 μm in film thickness was obtained in substantially the same manner as in Example 3, except that the compositions of the A layer and the B layer were changed as in the table.

Example 37

A biaxially oriented polyester film of 188 μm in film thickness was obtained in substantially the same manner as in Example 1, except that the compositions of the A layer and the B layer were changed as in the table.

Example 38

A biaxially oriented polyester film of 188 μm in film thickness was obtained in substantially the same manner as in Example 3, except that the compositions of the A layer and the B layer were changed as in the table.

Example 39

A biaxially oriented polyester film of 188 μm in film thickness was obtained in substantially the same manner as in Example 29, except that the heat treatment temperature subsequent to the drawing in the widthwise direction was changed to 215° C.

Example 40

A biaxially oriented polyester film of 188 μm in film thickness was obtained in substantially the same manner as in Example 29, except that the heat treatment temperature subsequent to the drawing in the widthwise direction was changed to 240° C.

Example 41

A biaxially oriented polyester film of 188 μm in film thickness was obtained in substantially the same manner as in Example 31, except that the lamination ratio was changed as in the table.

Example 42

A biaxially oriented polyester film of 188 μm in film thickness was obtained in substantially the same manner as in Example 31, except that the lamination ratio was changed as in the table.

Example 43

A biaxially oriented polyester film of 188 μm in film thickness was obtained in substantially the same manner as in Example 31, except that the A layer extruder and the B layer extruder were single-screw extruders.

Example 44

A biaxially oriented polyester film of 188 μm in film thickness was obtained in substantially the same manner as in Example 31, except that the melting was performed with the A layer extruder cylinder temperature being 275° C. and the B layer extruder cylinder temperature being 275° C., and that the short-pipe temperature subsequent to confluence of the A layer and the B layer was 275° C. and the mouthpiece temperature was 275° C.

Example 45

A biaxially oriented polyester film of 188 μm in film thickness was obtained in substantially the same manner as in Example 29, except that the compositions of the A layer and the B layer were changed as in the table.

Example 46

A biaxially oriented polyester film of 188 μm in film thickness was obtained in substantially the same manner as in Example 37, except that the thicknesses of the A layer and the B layer were changed as in the table.

Example 47

A biaxially oriented polyester film of 188 μm in film thickness was obtained in substantially the same manner as in Example 34, except that the compositions of the A layer and the B layer were changed as in the table.

Example 48

A biaxially oriented polyester film of 188 μm in film thickness was obtained in substantially the same manner as in Example 34, except that the oxygen concentration of each extruder was 1 vol %.

TABLE 1

|  |  |  | Example 1 | Example 2 | Example 3 |
|---|---|---|---|---|---|
| Film construction | B layer | | Polyester A (50 wt %) Polyester B (50 wt %) | Polyester A (50 wt %) Polyester B (50 wt %) | Polyester A (50 wt %) Polyester B (50 wt %) |
| | A layer | | Polyester A (94 wt %) Polyester B (5 wt %) Particle master (1 wt %) | Polyester A (94 wt %) Polyester B (5 wt %) Particle master (1 wt %) | Polyester A (94 wt %) Polyester B (5 wt %) Particle master (1 wt %) |
| Layer construction (layer thicknesses (μm)) | | | A/B/A (20/148/20) | A/B/A (20/148/20) | A/B/A (20/148/20) |
| Laminate ratio (H) A layer/entire film | | | 0.21 | 0.21 | 0.21 |
| Composition | B layer | Glycol component | EG (84.5 mol %) CHDM (15.5 mol %) | EG (84.5 mol %) CHDM (15.5 mol %) | EG (84.5 mol %) CHDM (15.5 mol %) |
| | | Acid component | TPA (100 mol %) | TPA (100 mol %) | TPA (100 mol %) |
| | A layer | Glycol component | EG (98.5 mol %) CHDM (1.5 mol %) | EG (98.5 mol %) CHDM (1.5 mol %) | EG (98.5 mol %) CHDM (1.5 mol %) |
| | | Acid component | TPA (100 mol %) | TPA (100 mol %) | TPA (100 mol %) |
| | Entire film | Glycol component | EG (87.5 mol %) CHDM (12.5 mol %) | EG (87.5 mol %) CHDM (12.5 mol %) | EG (87.5 mol %) CHDM (12.5 mol %) |
| | | Acid component | TPA (100 mol %) | TPA (100 mol %) | TPA (100 mol %) |

|  |  |  | Example 4 | Example 5 | Example 6 |
|---|---|---|---|---|---|
| Film construction | B layer | | Polyester A (50 wt %) Polyester B (50 wt %) | Polyester A (50 wt %) Polyester B (50 wt %) | Polyester A (50 wt %) Polyester B (50 wt %) |
| | A layer | | Polyester A (89 wt %) Polyester B (10 wt %) Particle master (1 wt %) | Polyester A (89 wt %) Polyester B (10 wt %) Particle master (1 wt %) | Polyester A (89 wt %) Polyester B (10 wt %) Particle master (1 wt %) |
| Layer construction (layer thicknesses (μm)) | | | A/B/A (20/148/20) | A/B/A (20/148/20) | A/B/A (20/148/20) |
| Laminate ratio (H) A layer/entire film | | | 0.21 | 0.21 | 0.21 |
| Composition | B layer | Glycol component | EG (84.5 mol %) CHDM (15.5 mol %) | EG (84.5 mol %) CHDM (15.5 mol %) | EG (84.5 mol %) CHDM (15.5 mol %) |
| | | Acid component | TPA (100 mol %) | TPA (100 mol %) | TPA (100 mol %) |
| | A layer | Glycol component | EG (97.1 mol %) CHDM (2.9 mol %) | EG (97.1 mol %) CHDM (2.9 mol %) | EG (97.1 mol %) CHDM (2.9 mol %) |
| | | Acid component | TPA (100 mol %) | TPA (100 mol %) | TPA (100 mol %) |
| | Entire film | Glycol component | EG (87.2 mol %) CHDM (12.8 mol %) | EG (87.2 mol %) CHDM (12.8 mol %) | EG (87.2 mol %) CHDM (12.8 mol %) |
| | | Acid component | TPA (100 mol %) | TPA (100 mol %) | TPA (100 mol %) |

TABLE 2

|  |  |  | Example 1 | Example 2 | Example 3 | Example 4 | Example 5 | Example 6 |
|---|---|---|---|---|---|---|---|---|
| B layer | TmB (° C.) | | 240 | 240 | 240 | 240 | 240 | 240 |
| A layer | TmA (° C.) | | 254 | 254 | 254 | 252 | 252 | 252 |
| Film properties | Tcc | | 177 | 178 | 179 | 178 | 179 | 179 |
| | Tm1 | | 240 | 240 | 240 | 240 | 240 | 240 |
| | Tm2 | | 246 | 246 | 246 | 245 | 245 | 245 |
| | 150° C. F100 value (MPa) (MD/TD) | | 27/29 | 26/27 | 26/26 | 24/26 | 22/25 | 21/24 |
| | 150° C. breaking elongation (%) (MD/TD) | | 284/266 | 246/237 | 221/207 | 297/274 | 266/254 | 239/224 |
| | Storage elastic modulus (MPa) | 100° C. (MD/TD) | 842/869 | 831/855 | 829/851 | 722/740 | 716/736 | 704/716 |
| | | 180° C. (MD/TD) | 167/188 | 159/179 | 154/169 | 141/158 | 137/141 | 129/138 |
| | 150° C. thermal shrinkage ratio (%) (MD/TD) | | 2.0/0.4 | 0.8/0.1 | 0.5/−0.1 | 2.0/0.3 | 0.7/0.2 | 0.5/−0.1 |
| | Thermal deformation ratio (%) | 150° C. (MD/TD) | −0.2/−0.4 | +1.2/+0.9 | +1.3/+1.1 | −0.3/−0.4 | +1.0/+0.8 | +1.2/+1.1 |
| | | 180° C. (MD/TD) | −1.2/−1.0 | +0.8/−0.1 | +0.9/+0.8 | −1.4/−1.1 | +0.8/−0.1 | +0.9/+0.7 |
| | Tmeta (° C.) | | 234 | 234 | 234 | 234 | 234 | 234 |
| | Haze (%) | | 1.5 | 1.5 | 1.5 | 1.5 | 1.5 | 1.5 |
| | b value | | 1.0 | 1.0 | 1.0 | 1.0 | 1.0 | 1.0 |
| Evaluation | Moldability 1 | | A | A | A | A | A | A |
| | Moldability 2 | | A | A | A | A | A | A |
| | Moldability 3 | | A | A | A | A | A | A |
| | Moldability 4 | | B | B | B | B | B | B |
| | Dimensional stability | | A | A | A | A | A | A |

TABLE 2-continued

|  | Example 1 | Example 2 | Example 3 | Example 4 | Example 5 | Example 6 |
|---|---|---|---|---|---|---|
| Post-molding dimensional stability 1 | C | B | A | C | B | A |
| Post-molding dimensional stability 2 | C | B | A | C | B | A |
| Inter-layer adhesion property | A | A | A | A | A | A |
| Film external appearance | A | A | A | A | A | A |
| Weather resistance | B | B | B | B | B | B |
| Scratch resistance | A | A | A | A | A | A |

TABLE 3

|  |  |  | Example 7 | Example 8 | Example 9 |
|---|---|---|---|---|---|
| Film construction | B layer |  | Polyester A (50 wt %) Polyester B (50 wt %) | Polyester A (50 wt %) Polyester B (50 wt %) | Polyester A (50 wt %) Polyester B (50 wt %) |
|  | A layer |  | Polyester A (84 wt %) Polyester B (15 wt %) Particle master (1 wt %) | Polyester A (84 wt %) Polyester B (15 wt %) Particle master (1 wt %) | Polyester A (99 wt %) Particle master (1 wt %) |
| Layer construction (layer thicknesses (μm)) |  |  | A/B/A (20/148/20) | A/B/A (20/148/20) | A/B/A (20/148/20) |
| Laminate ratio (H) A layer/entire film |  |  | 0.21 | 0.21 | 0.21 |
| Composition | B layer | Glycol component | EG (84.5 mol %) CHDM (15.5 mol %) | EG (84.5 mol %) CHDM (15.5 mol %) | EG (84.5 mol %) CHDM (15.5 mol %) |
|  |  | Acid component | TPA (100 mol %) | TPA (100 mol %) | TPA (100 mol %) |
|  | A layer | Glycol component | EG (95.6 mol %) CHDM (4.4 mol %) | EG (95.6 mol %) CHDM (4.4 mol %) | EG (100 mol %) |
|  |  | Acid component | TPA (100 mol %) | TPA (100 mol %) | TPA (100 mol %) |
|  | Entire film | Glycol component | EG (86.9 mol %) CHDM (13.1 mol %) | EG (86.9 mol %) CHDM (13.1 mol %) | EG (87.8 mol %) CHDM (12.2 mol %) |
|  |  | Acid component | TPA (100 mol %) | TPA (100 mol %) | TPA (100 mol %) |

|  |  |  | Example 10 | Example 11 | Example 12 |
|---|---|---|---|---|---|
| Film construction | B layer |  | Polyester A (50 wt %) Polyester B (50 wt %) | Polyester A (50 wt %) Polyester B (50 wt %) | Polyester A (50 wt %) Polyester B (50 wt %) |
|  | A layer |  | Polyester A (99 wt %) Particle master (1 wt %) | Polyester A (79 wt %) Polyester B (20 wt %) Particle master (1 wt %) | Polyester A (79 wt %) Polyester B (20 wt %) Particle master (1 wt %) |
| Layer construction (layer thicknesses (μm)) |  |  | A/B/A (20/148/20) | A/B/A (20/148/20) | A/B/A (20/148/20) |
| Laminate ratio (H) A layer/entire film |  |  | 0.21 | 0.21 | 0.21 |
| Composition | B layer | Glycol component | EG (84.5 mol %) CHDM (15.5 mol %) | EG (84.5 mol %) CHDM (15.5 mol %) | EG (84.5 mol %) CHDM (15.5 mol %) |
|  |  | Acid component | TPA (100 mol %) | TPA (100 mol %) | TPA (100 mol %) |
|  | A layer | Glycol component | EG (100 mol %) | EG (94 mol %) CHDM (6 mol %) | EG (94 mol %) CHDM (6 mol %) |
|  |  | Acid component | TPA (100 mol %) | TPA (100 mol %) | TPA (100 mol %) |
|  | Entire film | Glycol component | EG (87.8 mol %) CHDM (12.2 mol %) | EG (86.6 mol %) CHDM (13.4 mol %) | EG (86.6 mol %) CHDM (13.4 mol %) |
|  |  | Acid component | TPA (100 mol %) | TPA (100 mol %) | TPA (100 mol %) |

TABLE 4

|  |  |  | Example 7 | Example 8 | Example 9 | Example 10 | Example 11 | Example 12 |
|---|---|---|---|---|---|---|---|---|
| B layer | TmB (° C.) |  | 240 | 240 | 240 | 240 | 240 | 240 |
| A layer | TmA (° C.) |  | 250 | 250 | 255 | 255 | 249 | 249 |
| Film properties | Tcc |  | 179 | 180 | 176 | 176 | 186 | 186 |
|  | Tm1 |  | 240 | 240 | 240 | 240 | 240 | 240 |
|  | Tm2 |  | 244 | 244 | 247 | 247 | 244 | 244 |
|  | 150° C. F100 value (MPa) (MD/TD) |  | 19/22 | 18/21 | 31/35 | 30/33 | 17/19 | 18/21 |
|  | 150° C. breaking elongation (%) (MD/TD) |  | 314/297 | 287/271 | 254/241 | 212/204 | 316/303 | 295/288 |
|  | Storage elastic modulus (MPa) | 100° C. (MD/TD) | 674/687 | 663/679 | 876/883 | 854/872 | 623/637 | 610/620 |
|  |  | 180° C. (MD/TD) | 121/126 | 118/124 | 212/224 | 204/215 | 84/89 | 82/87 |
|  | 150° C. thermal shrinkage ratio (%) (MD/TD) |  | 2.1/0.4 | 0.6/0 | 1.8/0.3 | 0.4/−0.2 | 2.2/0.6 | 0.6/0 |
|  | Thermal deformation ratio (%) | 150° C. (MD/TD) | −0.5/−0.5 | +1.1/+1.0 | −0.2/−0.2 | +1.4/+1.1 | −0.6/−0.7 | +1.0/+1.1 |
|  |  | 180° C. (MD/TD) | −1.6/−1.2 | +0.9/+0.5 | −1.0/−0.8 | +0.9/+0.8 | −1.8/−1.2 | +0.9/+0.5 |

TABLE 4-continued

|  |  | Example 7 | Example 8 | Example 9 | Example 10 | Example 11 | Example 12 |
|---|---|---|---|---|---|---|---|
|  | Tmeta (° C.) | 234 | 234 | 234 | 234 | 234 | 234 |
|  | Haze (%) | 1.6 | 1.6 | 1.4 | 1.4 | 1.6 | 1.6 |
|  | b value | 1.0 | 1.0 | 0.9 | 0.9 | 1.0 | 1.0 |
| Evaluation | Moldability 1 | A | A | B | B | A | A |
|  | Moldability 2 | A | A | A | A | A | A |
|  | Moldability 3 | A | A | A | A | D1 | D1 |
|  | Moldability 4 | B | B | B | B | A | A |
|  | Dimensional stability | A | A | A | A | A | A |
|  | Post-molding dimensional stability 1 | C | A | C | A | C | A |
|  | Post-molding dimensional stability 2 | C | A | C | A | C | A |
|  | Inter-layer adhesion property | A | A | B | B | A | A |
|  | Film external appearance | A | A | A | A | A | A |
|  | Weather resistance | B | B | B | B | B | B |
|  | Scratch resistance | A | A | A | A | B | B |

TABLE 5

|  |  |  | Example 13 | Example 14 | Example 15 |
|---|---|---|---|---|---|
| Film construction | B layer |  | Polyester A (45 wt %) Polyester B (55 wt %) | Polyester A (45 wt %) Polyester B (55 wt %) | Polyester A (40 wt %) Polyester B (60 wt %) |
|  | A layer |  | Polyester A (84 wt %) Polyester B (15 wt %) Particle master (1 wt %) | Polyester A (84 wt %) Polyester B (15 wt %) Particle master (1 wt %) | Polyester A (84 wt %) Polyester B (15 wt %) Particle master (1 wt %) |
| Layer construction (layer thicknesses (μm)) |  |  | A/B/A (20/148/20) | A/B/A (20/148/20) | A/B/A (20/148/20) |
| Laminate ratio (H) A layer/entire film |  |  | 0.21 | 0.21 | 0.21 |
| Composition | B layer | Glycol component | EG (82.9 mol %) CHDM (17.1 mol %) | EG (82.9 mol %) CHDM (17.1 mol %) | EG (81.2 mol %) CHDM (18.8 mol %) |
|  |  | Acid component | TPA (100 mol %) | TPA (100 mol %) | TPA (100 mol %) |
|  | A layer | Glycol component | EG (95.6 mol %) CHDM (4.4 mol %) | EG (95.6 mol %) CHDM (4.4 mol %) | EG (95.6 mol %) CHDM (4.4 mol %) |
|  |  | Acid component | TPA (100 mol %) | TPA (100 mol %) | TPA (100 mol %) |
|  | Entire film | Glycol component | EG (85.6 mol %) CHDM (14.4 mol %) | EG (85.6 mol %) CHDM (14.4 mol %) | EG (84.3 mol %) CHDM (15.7 mol %) |
|  |  | Acid component | TPA (100 mol %) | TPA (100 mol %) | TPA (100 mol %) |
|  |  |  | Example 16 | Example 17 | Example 18 |
| Film construction | B layer |  | Polyester A (40 wt %) Polyester B (60 wt %) | Polyester A (35 wt %) Polyester B (65 wt %) | Polyester A (35 wt %) Polyester B (65 wt %) |
|  | A layer |  | Polyester A (84 wt %) Polyester B (15 wt %) Particle master (1 wt %) | Polyester A (84 wt %) Polyester B (15 wt %) Particle master (1 wt %) | Polyester A (84 wt %) Polyester B (15 wt %) Particle master (1 wt %) |
| Layer construction (layer thicknesses (μm)) |  |  | A/B/A (20/148/20) | A/B/A (20/148/20) | A/B/A (20/148/20) |
| Laminate ratio (H) A layer/entire film |  |  | 0.21 | 0.21 | 0.21 |
| Composition | B layer | Glycol component | EG (81.2 mol %) CHDM (18.8 mol %) | EG (79.5 mol %) CHDM (20.5 mol %) | EG (79.5 mol %) CHDM (20.5 mol %) |
|  |  | Acid component | TPA (100 mol %) | TPA (100 mol %) | TPA (100 mol %) |
|  | A layer | Glycol component | EG (95.6 mol %) CHDM (4.4 mol %) | EG (95.6 mol %) CHDM (4.4 mol %) | EG (95.6 mol %) CHDM (4.4 mol %) |
|  |  | Acid component | TPA (100 mol %) | TPA (100 mol %) | TPA (100 mol %) |
|  | Entire film | Glycol component | EG (85.6 mol %) CHDM (14.4 mol %) | EG (82.9 mol %) CHDM (17.1 mol %) | EG (82.9 mol %) CHDM (17.1 mol %) |
|  |  | Acid component | TPA (100 mol %) | TPA (100 mol %) | TPA (100 mol %) |

TABLE 6

|  |  | Example 13 | Example 14 | Example 15 | Example 16 | Example 17 | Example 18 |
|---|---|---|---|---|---|---|---|
| B layer | TmB (° C.) | 238 | 238 | 236 | 236 | 234 | 234 |
| A layer | TmA (° C.) | 250 | 250 | 250 | 250 | 250 | 250 |
| Film properties | Tcc | 184 | 184 | 185 | 185 | 187 | 188 |
|  | Tm1 | 238 | 238 | 236 | 236 | 234 | 234 |
|  | Tm2 | 243 | 243 | 241 | 241 | 239 | 239 |
|  | 150° C. F100 value (MPa) (MD/TD) | 16/18 | 15/17 | 14/15 | 13/14 | 12/13 | 12/13 |

TABLE 6-continued

|  |  |  | Example 13 | Example 14 | Example 15 | Example 16 | Example 17 | Example 18 |
|---|---|---|---|---|---|---|---|---|
|  | 150° C. breaking elongation (%) (MD/TD) |  | 328/309 | 291/283 | 341/327 | 302/289 | 351/336 | 310/294 |
|  | Storage elastic modulus | 100° C. (MD/TD) | 588/596 | 579/593 | 512/526 | 509/524 | 453/461 | 447/452 |
|  | (MPa) | 180° C. (MD/TD) | 109/111 | 106/107 | 94/96 | 93/94 | 79/81 | 76/79 |
|  | 150° C. thermal shrinkage ratio (%) (MD/TD) |  | 2.3/0.7 | 0.7/−0.1 | 2.5/0.9 | 0.8/−0.1 | 2.7/1.1 | 0.8/0 |
|  | Thermal deformation | 150° C. (MD/TD) | −0.8/−0.8 | +1.0/+0.9 | −0.9/−0.8 | +1.0/+0.9 | −1.1/−0.9 | +1.0/+0.9 |
|  | ratio (%) | 180° C. (MD/TD) | −1.9/−1.6 | +0.9/+0.4 | −2.2/−1.7 | +0.8/+0.3 | −2.4/−1.8 | +0.8/+0.2 |
|  | Tmeta (° C.) |  | 234 | 234 | 234 | 234 | 234 | 234 |
|  | Haze (%) |  | 1.6 | 1.6 | 1.6 | 1.6 | 1.8 | 1.8 |
|  | b value |  | 1.0 | 1.0 | 1.0 | 1.0 | 1.1 | 1.1 |
| Evaluation | Moldability 1 |  | A | A | A | A | A | A |
|  | Moldability 2 |  | A | A | A | A | A | A |
|  | Moldability 3 |  | A | A | A | A | D1 | D1 |
|  | Moldability 4 |  | B | B | B | B | B | B |
|  | Dimensional stability |  | A | A | A | A | B | B |
|  | Post-molding dimensional stability 1 |  | C | A | C | A | C | A |
|  | Post-molding dimensional stability 2 |  | C | A | C | A | C | A |
|  | Inter-layer adhesion property |  | A | A | A | A | A | A |
|  | Film external appearance |  | A | A | A | A | A | A |
|  | Weather resistance |  | B | B | B | B | B | B |
|  | Scratch resistance |  | A | A | A | A | A | A |

TABLE 7

|  |  |  | Example 19 | Example 20 | Example 21 |
|---|---|---|---|---|---|
| Film construction | B layer |  | Polyester A (50 wt %) | Polyester A (50 wt %) | Polyester A (50 wt %) |
|  |  |  | Polyester B (50 wt %) | Polyester B (50 wt %) | Polyester B (50 wt %) |
|  | A layer |  | Polyester A (89 wt %) | Polyester A (89 wt %) | Polyester A (89 wt %) |
|  |  |  | Polyester B (10 wt %) | Polyester B (10 wt %) | Polyester B (10 wt %) |
|  |  |  | Particle master (1 wt %) | Particle master (1 wt %) | Particle master (1 wt %) |
| Layer construction (layer thicknesses (μm)) |  |  | A/B/A (10/168/10) | A/B/A (30/128/30) | A/B/A (20/148/20) |
| Laminate ratio (H) A layer/entire film |  |  | 0.11 | 0.32 | 0.21 |
| Composition | B layer | Glycol component | EG (84.5 mol %) | EG (84.5 mol %) | EG (84.5 mol %) |
|  |  |  | CHDM (15.5 mol %) | CHDM (15.5 mol %) | CHDM (15.5 mol %) |
|  |  | Acid component | TPA (100 mol %) | TPA (100 mol %) | TPA (100 mol %) |
|  | A layer | Glycol component | EG (97.1 mol %) | EG (97.1 mol %) | EG (97.1 mol %) |
|  |  |  | CHDM (2.9 mol %) | CHDM (2.9 mol %) | CHDM (2.9 mol %) |
|  |  | Acid component | TPA (100 mol %) | TPA (100 mol %) | TPA (100 mol %) |
|  | Entire film | Glycol component | EG (85.9 mol %) | EG (88.5 mol %) | EG (87.2 mol %) |
|  |  |  | CHDM (14.1 mol %) | CHDM (11.5 mol %) | CHDM (12.8 mol %) |
|  |  | Acid component | TPA (100 mol %) | TPA (100 mol %) | TPA (100 mol %) |

|  |  |  | Example 22 | Example 23 | Example 24 |
|---|---|---|---|---|---|
| Film construction | B layer |  | Polyester A (50 wt %) | Polyester A (50 wt %) | Polyester A (40 wt %) |
|  |  |  | Polyester B (50 wt %) | Polyester B (50 wt %) | Polyester C (60 wt %) |
|  | A layer |  | Polyester A (89 wt %) | Polyester A (94 wt %) | Polyester A (89 wt %) |
|  |  |  | Polyester B (10 wt %) | Polyester B (5 wt %) | Polyester C (10 wt %) |
|  |  |  | Particle master (1 wt %) | Particle master (1 wt %) | Particle master (1 wt %) |
| Layer construction (layer thicknesses (μm)) |  |  | A/B/A (20/148/20) | A/B/A (10/80/10) | A/B/A (20/148/20) |
| Laminate ratio (H) A layer/entire film |  |  | 0.21 | 0.33 | 0.21 |
| Composition | B layer | Glycol component | EG (84.5 mol %) | EG (84.5 mol %) | EG (82.5 mol %) |
|  |  |  | CHDM (15.5 mol %) | CHDM (15.5 mol %) | NPG (17.5 mol %) |
|  |  | Acid component | TPA (100 mol %) | TPA (100 mol %) | TPA (100 mol %) |
|  | A layer | Glycol component | EG (97.1 mol %) | EG (98.5 mol %) | EG (97.2 mol %) |
|  |  |  | CHDM (2.9 mol %) | CHDM (1.5 mol %) | NPG (2.8 mol %) |
|  |  | Acid component | TPA (100 mol %) | TPA (100 mol %) | TPA (100 mol %) |
|  | Entire film | Glycol component | EG (87.2 mol %) | EG (87.5 mol %) | EG (87.2 mol %) |
|  |  |  | CHDM (12.8 mol %) | CHDM (12.5 mol %) | NPG (12.8 mol %) |
|  |  | Acid component | TPA (100 mol %) | TPA (100 mol %) | TPA (100 mol %) |

TABLE 8

|  |  | Example 19 | Example 20 | Example 21 | Example 22 | Example 23 | Example 24 |
|---|---|---|---|---|---|---|---|
| B layer | TmB (° C.) | 240 | 240 | 240 | 240 | 240 | 234 |
| A layer | TmA (° C.) | 252 | 252 | 252 | 252 | 254 | 247 |
| Film properties | Tcc | 178 | 178 | 173 | 174 | 177 | 186 |
|  | Tm1 | 240 | 240 | 240 | 240 | 240 | 234 |
|  | Tm2 | 243 | 246 | 236 | 238 | 246 | 236 |
|  | 150° C. F100 value (MPa) (MD/TD) | 18/22 | 25/27 | 27/29 | 26/27 | 28/29 | 16/17 |
|  | 150° C. breaking elongation (%) (MD/TD) | 241/236 | 223/217 | 224/230 | 226/231 | 264/238 | 331/308 |
|  | Storage elastic modulus 100° C. (MD/TD) | 688/703 | 723/738 | 914/924 | 901/909 | 851/872 | 468/472 |
|  | (MPa) 180° C. (MD/TD) | 118/123 | 136/145 | 139/144 | 132/140 | 165/192 | 82/84 |
|  | 150° C. thermal shrinkage ratio (%) (MD/TD) | 0.7/−0.1 | 0.6/−0.2 | 0.6/−0.1 | 0.7/−0.1 | 1.9/0.5 | 2.8/1.2 |
|  | Thermal deformation 150° C. (MD/TD) | +1.2/+1.4 | +1.4/+1.2 | +1.2/+1.2 | +1.3/+1.2 | −0.2/−0.3 | −1.3/−0.9 |
|  | ratio (%) 180° C. (MD/TD) | +0.8/+0.5 | +0.8/+0.6 | +0.9/+0.7 | +1.0/+0.7 | −1.3/−1.1 | −2.5/−1.8 |
|  | Tmeta (° C.) | 234 | 234 | 234 | 234 | 234 | 234 |
|  | Haze (%) | 1.4 | 1.6 | 1.5 | 1.5 | 1.4 | 1.8 |
|  | b value | 1.0 | 1.0 | 1.0 | 1.0 | 1.0 | 1.1 |
| Evaluation | Moldability 1 | A | A | B | B | A | A |
|  | Moldability 2 | A | A | A | A | A | A |
|  | Moldability 3 | A | A | A | A | A | D1 |
|  | Moldability 4 | B | B | B | B | B | B |
|  | Dimensional stability | A | A | A | A | A | B |
|  | Post-molding dimensional stability 1 | A | A | A | A | C | C |
|  | Post-molding dimensional stability 2 | A | A | A | A | C | C |
|  | Inter-layer adhesion property | A | A | A | A | A | A |
|  | Film external appearance | A | A | A | A | A | A |
|  | Weather resistance | B | B | B | B | B | B |
|  | Scratch resistance | A | A | A | A | A | A |

TABLE 9

|  |  | Example 25 | Example 26 | Example 27 | Example 28 |
|---|---|---|---|---|---|
| Film construction | B layer | Polyester A (50 wt %) Polyester B (50 wt %) | Polyester A (50 wt %) Polyester B (50 wt %) | Polyester A (49 wt %) Polyester B (50 wt %) Weather-resistant agent master (1 wt %) | Polyester A (50 wt %) Polyester B (50 wt %) |
|  | A layer | Polyester A (89 wt %) Polyester B (10 wt %) Particle master (1 wt %) | Polyester A (89 wt %) Polyester B (10 wt %) Particle master (1 wt %) | Polyester A (84 wt %) Polyester B (15 wt %) Particle master (1 wt %) | Polyester A (84 wt %) Polyester B (15 wt %) Particle master (1 wt %) |
| Layer construction (layer thicknesses (μm)) |  | A/B/A (20/148/20) | A/B/A (20/148/20) | A/B/A (20/148/20) | A/B/A (20/148/20) |
| Laminate ratio (H) A layer/entire film |  | 0.21 | 0.21 | 0.21 | 0.21 |
| Composition | B layer Glycol component | EG (84.5 mol %) CHDM (15.5 mol %) | EG (84.5 mol %) CHDM (15.5 mol %) | EG (84.5 mol %) CHDM (15.5 mol %) | EG (84.5 mol %) CHDM (15.5 mol %) |
|  | Acid component | TPA (100 mol %) | TPA (100 mol %) | TPA (100 mol %) | TPA (100 mol %) |
|  | A layer Glycol component | EG (97.1 mol %) CHDM (2.9 mol %) | EG (97.1 mol %) CHDM (2.9 mol %) | EG (95.6 mol %) CHDM (4.4 mol %) | EG (95.6 mol %) CHDM (4.4 mol %) |
|  | Acid component | TPA (100 mol %) | TPA (100 mol %) | TPA (100 mol %) | TPA (100 mol %) |
|  | Entire film Glycol component | EG (87.2 mol %) CHDM (12.8 mol %) | EG (87.2 mol %) CHDM (12.8 mol %) | EG (86.9 mol %) CHDM (13.1 mol %) | EG (86.9 mol %) CHDM (13.1 mol %) |
|  | Acid component | TPA (100 mol %) | TPA (100 mol %) | TPA (100 mol %) | TPA (100 mol %) |

TABLE 10

|  |  | Example 25 | Example 26 | Example 27 | Example 28 |
|---|---|---|---|---|---|
| B layer | TmB (° C.) | 240 | 240 | 240 | 240 |
| A layer | TmA (° C.) | 252 | 252 | 250 | 250 |
| Film properties | Tcc | 176 | 179 | 178 | 181 |
|  | Tm1 | 240 | 240 | 240 | 240 |
|  | Tm2 | 239 | 246 | 244 | 244 |
|  | 150° C. F100 value (MPa) (MD/TD) | 35/38 | 21/22 | 17/23 | 15/21 |
|  | 150° C. breaking elongation (%) (MD/TD) | 251/235 | 321/208 | 282/270 | 261/250 |
|  | Storage elastic modulus 100° C. (MD/TD) | 926/947 | 695/704 | 660/669 | 648/651 |
|  | (MPa) 180° C. (MD/TD) | 166/168 | 124/144 | 112/121 | 110/115 |
|  | 150° C. thermal shrinkage ratio (%) (MD/TD) | 3.5/3.1 | 1.7/0.2 | 0.6/0 | 0.5/−0.1 |
|  | Thermal deformation 150° C. (MD/TD) | −2.3/−2.6 | −0.2/−0.2 | +1.2/+1.0 | +1.1/+1.0 |
|  | ratio (%) 180° C. (MD/TD) | −4.1/−4.0 | −1.1/−0.9 | +0.9/+0.5 | +0.9/+0.4 |

TABLE 10-continued

|  |  | Example 25 | Example 26 | Example 27 | Example 28 |
|---|---|---|---|---|---|
|  | Tmeta (° C.) | 205 | 239 | 234 | 234 |
|  | Haze (%) | 1.5 | 3.1 | 1.8 | 1.7 |
|  | b value | 1.0 | 1.0 | 1.2 | 1.7 |
| Evaluation | Moldability 1 | B | A | A | A |
|  | Moldability 2 | A | A | A | A |
|  | Moldability 3 | A | A | A | A |
|  | Moldability 4 | B | B | B | B |
|  | Dimensional stability | A | A | A | A |
|  | Post-molding dimensional stability 1 | C | C | A | A |
|  | Post-molding dimensional stability 2 | C | C | A | A |
|  | Inter-layer adhesion property | A | A | A | A |
|  | Film external appearance | A | C | A | B |
|  | Weather resistance | B | B | A | B |
|  | Scratch resistance | A | A | A | A |

TABLE 11

|  |  |  | Comparative Example 1 | Comparative Example 2 | Comparative Example 3 |
|---|---|---|---|---|---|
| Film construction | B layer |  | Polyester A (60 wt %) Polyester B (40 wt %) | Polyester A (4 wt %) Polyester D (95 wt %) Particle master (1 wt %) | Polyester A (79 wt %) Polyester B (20 wt %) Particle master (1 wt %) |
|  | A layer |  | Polyester A (99 wt %) Particle master (1 wt %) | — | — |
| Layer construction (layer thicknesses (μm)) |  |  | A/B/A (20/148/20) | B (188) | B (188) |
| Laminate ratio (H) A layer/entire film |  |  | 0.21 | — | — |
| Composition | B layer | Glycol component | EG (87..8 mol %) CHDM (12.2 mol %) | EG (100 mol %) | EG (94 mol %) CHDM (6 mol %) |
|  |  | Acid component | TPA (100 mol %) | TPA (83.4 mol %) IPA (16.6 mol %) | TPA (100 mol %) |
|  | A layer | Glycol component | EG (100 mol %) | — | — |
|  |  | Acid component | TPA (100 mol %) | — | — |
|  | Entire film | Glycol component | EG (90.4 mol %) CHDM (9.6 mol %) | EG (100 mol %) | EG (94 mol %) CHDM (6 mol %) |
|  |  | Acid component | TPA (100 mol %) | TPA (83.4 mol %) IPA (16.6 mol %) | TPA (100 mol %) |

TABLE 12

|  |  |  | Comparative Example 1 | Comparative Example 2 | Comparative Example 3 |
|---|---|---|---|---|---|
| B layer | TmB (° C.) |  | 242 | 225 | 249 |
| A layer | TmA (° C.) |  | 255 | — | — |
| Film properties | Tcc |  | 168 | 194 | 167 |
|  | Tm1 |  | 249 | 225 | 249 |
|  | Tm2 |  | 251 | 220 | 246 |
|  | 150° C. F100 value (MPa) (MD/TD) |  | 41/48 | 20/23 | 52/63 |
|  | 150° C. breaking elongation (%) (MD/TD) |  | 205/184 | 267/225 | 205/187 |
|  | Storage elastic modulus (MPa) | 100° C. (MD/TD) | 1326/1376 | 846/883 | 2310/2414 |
|  |  | 180° C. (MD/TD) | 190/218 | 38/42 | 224/251 |
|  | 150° C. thermal shrinkage ratio (%) (MD/TD) |  | 1.0/0.6 | 3.1/2.8 | 1.0/0.5 |
|  | Thermal deformation ratio (%) | 150° C. (MD/TD) | −0.1/−0.1 | −1.2/−0.9 | −0.1/−0.2 |
|  |  | 180° C. (MD/TD) | −0.9/−0.8 | −2.2/−1.5 | −1/−0.6 |
|  | Tmeta (° C.) |  | 234 | 220 | 234 |
|  | Haze (%) |  | 1.6 | 1.8 | 1.5 |
|  | b value |  | 0.8 | 1.2 | 1.0 |
| Evaluation | Moldability 1 |  | C | A | C |
|  | Moldability 2 |  | A | A | C |
|  | Moldability 3 |  | A | D2 | C |
|  | Moldability 4 |  | C | A | C |
|  | Dimensional stability |  | A | C | A |
|  | Post-molding dimensional stability 1 |  | C | C | C |
|  | Post-molding dimensional stability 2 |  | C | C | C |
|  | Inter-layer adhesion property |  | B | A | — |
|  | Film external appearance |  | A | A | A |
|  | Weather resistance |  | B | B | B |
|  | Scratch resistance |  | A | C | C |

TABLE 13

|  |  | Example 29 | Example 30 | Example 31 |
|---|---|---|---|---|
| Film construction | B layer | Polyester A (60 wt %) Polyester B (40 wt %) | Polyester A (60 wt %) Polyester B (40 wt %) | Polyester A (60 wt %) Polyester B (40 wt %) |
|  | A layer | Polyester A (79 wt %) Polyester B (20 wt %) Particle master (1 wt %) | Polyester A (79 wt %) Polyester B (20 wt %) Particle master (1 wt %) | Polyester A (79 wt %) Polyester B (20 wt %) Particle master (1 wt %) |
| Layer construction (layer thicknesses (μm)) |  | A/B/A (20/148/20) | A/B/A (20/148/20) | A/B/A (20/148/20) |
| Laminate ratio (H) A layer/entire film |  | 0.21 | 0.21 | 0.21 |
| Composition | B layer Glycol component | EG (87.2 mol %) CHDM (12.2 mol %) | EG (87.2 mol %) CHDM (12.2 mol %) | EG (87.2 mol %) CHDM (12.2 mol %) |
|  | Acid component | TPA (100 mol %) | TPA (100 mol %) | TPA (100 mol %) |
|  | A layer Glycol component | EG (94 mol %) CHDM (6 mol %) | EG (94 mol %) CHDM (6 mol %) | EG (94 mol %) CHDM (6 mol %) |
|  | Acid component | TPA (100 mol %) | TPA (100 mol %) | TPA (100 mol %) |
|  | Entire film Glycol component | EG (89.1 mol %) CHDM (10.9 mol %) | EG (89.1 mol %) CHDM (10.9 mol %) | EG (89.1 mol %) CHDM (10.9 mol %) |
|  | Acid component | TPA (100 mol %) | TPA (100 mol %) | TPA (100 mol %) |

|  |  | Example 32 | Example 33 | Example 34 |
|---|---|---|---|---|
| Film construction | B layer | Polyester A (60 wt %) Polyester B (40 wt %) | Polyester A (60 wt %) Polyester B (40 wt %) | Polyester A (60 wt %) Polyester B (40 wt %) |
|  | A layer | Polyester A (74 wt %) Polyester B (25 wt %) Particle master (1 wt %) | Polyester A (69 wt %) Polyester B (30 wt %) Particle master (1 wt %) | Polyester A (69 wt %) Polyester B (30 wt %) Particle master (1 wt %) |
| Layer construction (layer thicknesses (μm)) |  | A/B/A (20/148/20) | A/B/A (20/148/20) | A/B/A (20/148/20) |
| Laminate ratio (H) A layer/entire film |  | 0.21 | 0.21 | 0.21 |
| Composition | B layer Glycol component | EG (87.2 mol %) CHDM (12.2 mol %) | EG (87.2 mol %) CHDM (12.2 mol %) | EG (87.2 mol %) CHDM (12.2 mol %) |
|  | Acid component | TPA (100 mol %) | TPA (100 mol %) | TPA (100 mol %) |
|  | A layer Glycol component | EG (92.5 mol %) CHDM (7.5 mol %) | EG (91 mol %) CHDM (9 mol %) | EG (91 mol %) CHDM (9 mol %) |
|  | Acid component | TPA (100 mol %) | TPA (100 mol %) | TPA (100 mol %) |
|  | Entire film Glycol component | EG (88.8 mol %) CHDM (11.2 mol %) | EG (88.5 mol %) CHDM (11.5 mol %) | EG (88.5 mol %) CHDM (11.5 mol %) |
|  | Acid component | TPA (100 mol %) | TPA (100 mol %) | TPA (100 mol %) |

TABLE 14

|  |  |  | Example 29 | Example 30 | Example 31 | Example 32 | Example 33 | Example 34 |
|---|---|---|---|---|---|---|---|---|
| B layer | TmB (° C.) |  | 242 | 242 | 242 | 242 | 242 | 242 |
| A layer | TmA (° C.) |  | 249 | 249 | 249 | 248 | 248 | 246 |
| Film properties | Tcc |  | 179 | 179 | 179 | 181 | 182 | 184 |
|  | Tm1 |  | 242 | 242 | 242 | 242 | 242 | 242 |
|  | Tm2 |  | 244 | 244 | 244 | 244 | 243 | 243 |
|  | 150° C. F100 value (MPa) (MD/TD) |  | 23/25 | 23/25 | 23/25 | 20/22 | 18/20 | 18/20 |
|  | 150° C. breaking elongation (%) (MD/TD) |  | 334/309 | 317/296 | 308/287 | 358/339 | 370/354 | 342/326 |
|  | Storage elastic modulus (MPa) | 100° C. (MD/TD) | 924/957 | 919/940 | 904/922 | 831/844 | 784/805 | 780/800 |
|  |  | 180° C. (MD/TD) | 144/158 | 138/149 | 129/142 | 112/141 | 94/109 | 90/105 |
|  | 150° C. thermal shrinkage ratio (%) (MD/TD) |  | 2.0/0.4 | 0.8/0.2 | 0.5/−0.2 | 2.1/0.5 | 0.8/0.2 | 0.5/−0.2 |
|  | Thermal deformation ratio (%) | 150° C. (MD/TD) | −0.2/−0.4 | +1.2/+0.9 | +1.4/+1.1 | −0.3/−0.4 | +1.3/+0.9 | +1.3/+1.2 |
|  |  | 180° C. (MD/TD) | −1.2/−1.0 | +0.8/−0.1 | +0.9/+0.8 | −1.4/−1.1 | +0.8/−0.1 | +0.9/+0.6 |
|  | Tmeta (° C.) |  | 234 | 234 | 234 | 234 | 234 | 234 |
|  | Haze (%) |  | 1.5 | 1.5 | 1.5 | 1.5 | 1.5 | 1.5 |
|  | b value |  | 1.0 | 1.0 | 1.0 | 1.0 | 1.0 | 1.0 |
| Evaluation | Moldability 1 |  | A | A | A | A | A | A |
|  | Moldability 2 |  | A | A | A | A | A | A |
|  | Moldability 3 |  | A | A | A | A | A | A |
|  | Moldability 4 |  | A | A | A | A | A | A |
|  | Dimensional stability |  | A | A | A | A | A | A |
|  | Post-molding dimensional stability 1 |  | C | B | A | C | C | A |
|  | Post-molding dimensional stability 2 |  | C | B | A | C | C | A |
|  | Inter-layer adhesion property |  | A | A | A | A | A | A |
|  | Film external appearance |  | A | A | A | A | A | A |
|  | Weather resistance |  | B | B | B | B | B | B |
|  | Scratch resistance |  | B | B | B | B | C | C |

TABLE 15

|  |  | Example 35 | Example 36 | Example 37 |
|---|---|---|---|---|
| Film construction | B layer | Polyester A (55 wt %) Polyester B (45 wt %) | Polyester A (55 wt %) Polyester B (45 wt %) | Polyester A (65 wt %) Polyester B (35 wt %) |
|  | A layer | Polyester A (79 wt %) Polyester B (20 wt %) Particle master (1 wt %) | Polyester A (79 wt %) Polyester B (20 wt %) Particle master (1 wt %) | Polyester A (79 wt %) Polyester B (20 wt %) Particle master (1 wt %) |
| Layer construction (layer thicknesses (μm)) |  | A/B/A (20/148/20) | A/B/A (20/148/20) | A/B/A (20/148/20) |
| Laminate ratio (H) A layer/entire film |  | 0.21 | 0.21 | 0.21 |
| Composition | B layer Glycol component | EG (86.2 mol %) CHDM (13.8 mol %) | EG (86.2 mol %) CHDM (13.8 mol %) | EG (89.4 mol %) CHDM (10.6 mol %) |
|  | Acid component | TPA (100 mol %) | TPA (100 mol %) | TPA (100 mol %) |
|  | A layer Glycol component | EG (94 mol %) CHDM (6 mol %) | EG (94 mol %) CHDM (6 mol %) | EG (94 mol %) CHDM (6 mol %) |
|  | Acid component | TPA (100 mol %) | TPA (100 mol %) | TPA (100 mol %) |
|  | Entire film Glycol component | EG (87.9 mol %) CHDM (12.1 mol %) | EG (87.9 mol %) CHDM (12.1 mol %) | EG (90.4 mol %) CHDM (9.6 mol %) |
|  | Acid component | TPA (100 mol %) | TPA (100 mol %) | TPA (100 mol %) |

|  |  | Example 38 | Example 39 | Example 40 |
|---|---|---|---|---|
| Film construction | B layer | Polyester A (65 wt %) Polyester B (35 wt %) | Polyester A (60 wt %) Polyester B (40 wt %) | Polyester A (60 wt %) Polyester B (40 wt %) |
|  | A layer | Polyester A (79 wt %) Polyester B (20 wt %) Particle master (1 wt %) | Polyester A (79 wt %) Polyester B (20 wt %) Particle master (1 wt %) | Polyester A (79 wt %) Polyester B (20 wt %) Particle master (1 wt %) |
| Layer construction (layer thicknesses (μm)) |  | A/B/A (20/148/20) | A/B/A (20/148/20) | A/B/A (20/148/20) |
| Laminate ratio (H) A layer/entire film |  | 0.21 | 0.21 | 0.21 |
| Composition | B layer Glycol component | EG (89.4 mol %) CHDM (10.6 mol %) | EG (87.2 mol %) CHDM (12.2 mol %) | EG (87.2 mol %) CHDM (12.2 mol %) |
|  | Acid component | TPA (100 mol %) | TPA (100 mol %) | TPA (100 mol %) |
|  | A layer Glycol component | EG (94 mol %) CHDM (6 mol %) | EG (94 mol %) CHDM (6 mol %) | EG (94 mol %) CHDM (6 mol %) |
|  | Acid component | TPA (100 mol %) | TPA (100 mol %) | TPA (100 mol %) |
|  | Entire film Glycol component | EG (90.4 mol %) CHDM (9.6 mol %) | EG (89.1 mol %) CHDM (10.9 mol %) | EG (89.1 mol %) CHDM (10.9 mol %) |
|  | Acid component | TPA (100 mol %) | TPA (100 mol %) | TPA (100 mol %) |

TABLE 16

|  |  |  | Example 35 | Example 36 | Example 37 | Example 38 | Example 39 | Example 40 |
|---|---|---|---|---|---|---|---|---|
| B layer | TmB (° C.) |  | 241 | 241 | 244 | 244 | 242 | 242 |
| A layer | TmA (° C.) |  | 249 | 249 | 249 | 249 | 249 | 249 |
| Film properties | Tcc |  | 183 | 183 | 177 | 1177 | 178 |  |
|  | Tm1 |  | 241 | 241 | 244 | 244 | 242 | 242 |
|  | Tm2 |  | 242 | 242 | 246 | 246 | 240 | 248 |
|  | 150° C. F100 value (MPa) (MD/TD) |  | 21/22 | 21/22 | 27/29 | 27/29 | 34/36 | 19/21 |
|  | 150° C. breaking elongation (%) (MD/TD) |  | 327/299 | 305/277 | 306/289 | 287/266 | 297/276 | 348/320 |
|  | Storage elastic modulus (MPa) | 100° C. (MD/TD) | 906/931 | 901/920 | 975/988 | 964/975 | 986/998 | 889/904 |
|  |  | 180° C. (MD/TD) | 128/137 | 110/115 | 184/196 | 179/187 | 189/196 | 121/143 |
|  | 150° C. thermal shrinkage ratio (%) (MD/TD) |  | 2.1/0.4 | 0.8/0.2 | 1.9/0.5 | 0.7/0.2 | 2.8/2.5 | 1.8/0.3 |
|  | Thermal deformation ratio (%) | 150° C. (MD/TD) | −0.3/−0.5 | +1.2/+0.8 | −0.2/−0.3 | +1.2/+0.6 | −1.6/−1.8 | −0.2/−0.2 |
|  |  | 180° C. (MD/TD) | −1.4/−1.1 | +0.8/−0.1 | −1.0/−0.7 | +0.9/−0.1 | −3.4/−3.1 | −1.0/−0.8 |
|  | Tmeta (° C.) |  | 234 | 234 | 234 | 234 | 215 | 240 |
|  | Haze (%) |  | 1.5 | 1.5 | 1.5 | 1.5 | 1.5 | 3.3 |
|  | b value |  | 1.0 | 1.0 | 1.0 | 1.0 | 1.0 | 1.0 |
| Evaluation | Moldability 1 |  | A | A | A | A | B | A |
|  | Moldability 2 |  | A | A | A | A | A | A |
|  | Moldability 3 |  | A | A | A | A | A | A |
|  | Moldability 4 |  | A | A | A | A | B | A |
|  | Dimensional stability |  | A | A | A | A | A | A |
|  | Post-molding dimensional stability 1 |  | C | A | C | A | C | C |
|  | Post-molding dimensional stability 2 |  | C | A | C | A | C | C |
|  | Inter-layer adhesion property |  | A | A | A | A | A | A |
|  | Film external appearance |  | A | A | A | A | A | C |
|  | Weather resistance |  | B | B | B | B | B | B |
|  | Scratch resistance |  | B | B | B | B | B | B |

TABLE 17

|  |  | Example 41 | Example 42 | Example 43 |
|---|---|---|---|---|
| Film construction | B layer | Polyester A (60 wt %) Polyester B (40 wt %) | Polyester A (60 wt %) Polyester B (40 wt %) | Polyester A (60 wt %) Polyester B (40 wt %) |
|  | A layer | Polyester A (79 wt %) Polyester B (20 wt %) Particle master (1 wt %) | Polyester A (79 wt %) Polyester B (20 wt %) Particle master (1 wt %) | Polyester A (79 wt %) Polyester B (20 wt %) Particle master (1 wt %) |
| Layer construction (layer thicknesses (μm)) |  | A/B/A (10/168/10) | A/B/A (30/128/30) | A/B/A (20/148/20) |
| Laminate ratio (H) A layer/entire film |  | 0.11 | 0.32 | 0.21 |
| Composition | B layer Glycol component | EG (87.2 mol %) CHDM (12.2 mol %) | EG (87.2 mol %) CHDM (12.2 mol %) | EG (87.2 mol %) CHDM (12.2 mol %) |
|  | Acid component | TPA (100 mol %) | TPA (100 mol %) | TPA (100 mol %) |
|  | A layer Glycol component | EG (94 mol %) CHDM (6 mol %) | EG (94 mol %) CHDM (6 mol %) | EG (94 mol %) CHDM (6 mol %) |
|  | Acid component | TPA (100 mol %) | TPA (100 mol %) | TPA (100 mol %) |
|  | Entire film Glycol component | EG (88.5 mol %) CHDM (11.5 mol %) | EG (89.8 mol %) CHDM (10.2 mol %) | EG (89.1 mol %) CHDM (10.9 mol %) |
|  | Acid component | TPA (100 mol %) | TPA (100 mol %) | TPA (100 mol %) |

|  |  | Example 44 | Example 45 | Example 46 |
|---|---|---|---|---|
| Film construction | B layer | Polyester A (60 wt %) Polyester B (40 wt %) | Polyester A (50 wt %) Polyester C (50 wt %) | Polyester A (65 wt %) Polyester B (35 wt %) |
|  | A layer | Polyester A (79 wt %) Polyester B (20 wt %) Particle master (1 wt %) | Polyester A (79 wt %) Polyester C (20 wt %) Particle master (1 wt %) | Polyester A (79 wt %) Polyester B (20 wt %) Particle master (1 wt %) |
| Layer construction (layer thicknesses (μm)) |  | A/B/A (20/148/20) | A/B/A (20/148/20) | A/B/A (12/100/12) |
| Laminate ratio (H) A layer/entire film |  | 0.21 | 0.21 | 0.19 |
| Composition | B layer Glycol component | EG (87.2 mol %) CHDM (12.2 mol %) | EG (85.5 mol %) NPG (14.5 mol %) | EG (89.4 mol %) CHDM (10.6 mol %) |
|  | Acid component | TPA (100 mol %) | TPA (100 mol %) | TPA (100 mol %) |
|  | A layer Glycol component | EG (94 mol %) CHDM (6 mol %) | EG (94.3 mol %) NPG (5.7 mol %) | EG (94 mol %) CHDM (6 mol %) |
|  | Acid component | TPA (100 mol %) | TPA (100 mol %) | TPA (100 mol %) |
|  | Entire film Glycol component | EG (89.1 mol %) CHDM (10.9 mol %) | EG (88.3 mol %) NPG (11.7 mol %) | EG (90.3 mol %) CHDM (9.7 mol %) |
|  | Acid component | TPA (100 mol %) | TPA (100 mol %) | TPA (100 mol %) |

TABLE 18

|  |  |  | Example 41 | Example 42 | Example 43 | Example 44 | Example 45 | Example 46 |
|---|---|---|---|---|---|---|---|---|
| B layer | TmB (° C.) |  | 242 | 242 | 242 | 242 | 236 | 244 |
| A layer | TmA (° C.) |  | 249 | 249 | 249 | 249 | 244 | 249 |
| Film properties | Tcc |  | 180 | 179 | 179 | 179 | 186 | 178 |
|  | Tm1 |  | 242 | 242 | 242 | 242 | 236 | 244 |
|  | Tm2 |  | 243 | 245 | 238 | 239 | 238 | 246 |
|  | 150° C. F100 value (MPa) (MD/TD) |  | 20/23 | 27/29 | 29/32 | 28/31 | 18/19 | 25/29 |
|  | 150° C. breaking elongation (%) (MD/TD) |  | 314/294 | 297/275 | 292/274 | 284/274 | 312/304 | 311/274 |
|  | Storage elastic modulus (MPa) | 100° C. (MD/TD) | 869/887 | 931/944 | 958/977 | 947/951 | 512/534 | 967/992 |
|  |  | 180° C. (MD/TD) | 115/130 | 134/151 | 141/157 | 144/155 | 72/79 | 176/198 |
|  | 150° C. thermal shrinkage ratio (%) (MD/TD) |  | 0.7/−0.1 | 0.4/−0.2 | 0.7/−0.1 | 0.6/−0.1 | 2.7/1.4 | 1.9/0.4 |
|  | Thermal deformation ratio (%) | 150° C. (MD/TD) | +1.4/+1.2 | +1.4/+1.2 | +1.4/+1.1 | +1.4/+1.0 | −1.5/−1.1 | −0.2/−0.4 |
|  |  | 180° C. (MD/TD) | +0.9/+0.7 | +0.9/+0.9 | +0.9/+0.8 | +0.9/+0.8 | −2.7/−1.9 | −1.0/−0.7 |
|  | Tmeta (° C.) |  | 234 | 234 | 234 | 234 | 234 | 234 |
|  | Haze (%) |  | 1.4 | 1.6 | 1.5 | 1.5 | 1.8 | 1.5 |
|  | b value |  | 1.0 | 1.0 | 1.0 | 1.0 | 1.1 | 1.0 |
| Evaluation | Moldability 1 |  | A | A | B | B | A | A |
|  | Moldability 2 |  | A | A | A | A | A | A |
|  | Moldability 3 |  | A | A | A | A | D1 | A |
|  | Moldability 4 |  | A | A | B | A | A | A |
|  | Dimensional stability |  | A | A | A | A | B | A |
|  | Post-molding dimensional stability 1 |  | A | A | A | A | C | C |
|  | Post-molding dimensional stability 2 |  | A | A | A | A | C | C |
|  | Inter-layer adhesion property |  | A | A | A | A | A | A |
|  | Film external appearance |  | A | A | A | A | A | A |
|  | Weather resistance |  | B | B | B | B | B | B |
|  | Scratch resistance |  | B | B | B | B | B | B |

TABLE 19

|  |  |  | Example 47 | Example 48 |
|---|---|---|---|---|
| Film construction | B layer |  | Polyester A (59 wt %) Polyester B (40 wt %) Weather-resistant agent master (1 wt %) | Polyester A (60 wt %) Polyester B (40 wt %) |
|  | A layer |  | Polyester A (69 wt %) Polyester B (30 wt %) Particle master (1 wt %) | Polyester A (69 wt %) Polyester B (30 wt %) Particle master (1 wt %) |
| Layer construction (layer thicknesses (μm)) |  |  | A/B/A (20/148/20) | A/B/A (20/148/20) |
| Laminate ratio (H) A layer/entire film |  |  | 0.21 | 0.21 |
| Composition | B layer | Glycol component | EG (87.2 mol %) CHDM (12.2 mol %) | EG (87.2 mol %) CHDM (12.2 mol %) |
|  |  | Acid component | TPA (100 mol %) | TPA (100 mol %) |
|  | A layer | Glycol component | EG (91 mol %) CHDM (9 mol %) | EG (91 mol %) CHDM (9 mol %) |
|  |  | Acid component | TPA (100 mol %) | TPA (100 mol %) |
|  | Entire film | Glycol component | EG (88.5 mol %) CHDM (11.5 mol %) | EG (88.5 mol %) CHDM (11.5 mol %) |
|  |  | Acid component | TPA (100 mol %) | TPA (100 mol %) |

TABLE 20

|  |  |  | Example 47 | Example 48 |
|---|---|---|---|---|
| B layer | TmB (° C.) |  | 242 | 242 |
| A layer | TmA (° C.) |  | 246 | 246 |
| Film properties | Tcc |  | 180 | 180 |
|  | Tm1 |  | 242 | 242 |
|  | Tm2 |  | 243 | 243 |
|  | 150° C. F100 value (MPa) (MD/TD) |  | 18/20 | 18/20 |
|  | 150° C. breaking elongation (%) (MD/TD) |  | 342/326 | 342/326 |
|  | Storage elastic modulus (MPa) | 100° C. (MD/TD) | 780/800 | 780/800 |
|  |  | 180° C. (MD/TD) | 90/105 | 90/105 |
|  | 150° C. thermal shrinkage ratio (%) (MD/TD) |  | 0.5/−0.2 | 0.5/−0.2 |
|  | Thermal deformation ratio (%) | 150° C. (MD/TD) | +1.3/+1.2 | +1.3/+1.2 |
|  |  | 180° C. (MD/TD) | +0.9/+0.6 | +0.9/+0.6 |
|  | Tmeta (° C.) |  | 234 | 234 |
|  | Haze (%) |  | 1.5 | 1.5 |
|  | b value |  | 1.2 | 1.6 |
| Evaluation | Moldability 1 |  | A | A |
|  | Moldability 2 |  | A | A |
|  | Moldability 3 |  | A | A |
|  | Moldability 4 |  | A | A |
|  | Dimensional stability |  | A | A |
|  | Post-molding dimensional stability 1 |  | A | A |
|  | Post-molding dimensional stability 2 |  | A | A |
|  | Inter-layer adhesion property |  | A | A |
|  | Film external appearance |  | A | B |
|  | Weather resistance |  | A | B |
|  | Scratch resistance |  | C | C |

The meanings of the abbreviations in the tables are as follows.
EG: ethylene glycol
CHDM: 1,4-cyclohexane dimethanol
DEG: diethylene glycol
NPG: neopentyl glycol
TPA: terephthalic acid
IPA: isophthalic acid

INDUSTRIAL APPLICABILITY

Our biaxially oriented polyester films are capable of being thermally shaped at low temperature of 100° C. to 150° C. because the storage elastic modulus thereof at 100° C. is low and the molding stress at 150° C. is low, and are also capable of restraining the decline in quality level at the time of molding even in a molding method that needs high-temperature molding because the storage elastic modulus at 180° C. is in a specific range. Therefore, the films can be suitably used for decoration of molded members such as building materials, mobile appliances, electrical machinery products, automotive component parts, amusement machine component parts and the like.

The invention claimed is:
1. A biaxially oriented polyester film for molding comprising a laminate polyester film having a polyester A layer and a polyester B layer, wherein:
the polyester A layer contains greater than or equal to 90 mol % and less than or equal to 99 mol % of ethylene glycol-derived structural units, and greater than or equal to 1 mol % and less than or equal to 10 mol % of 1,4-cyclohexane dimethanol-derived structural units and/or neopentyl glycol-derived structural units, relative to diol-derived structural units; and the polyester B layer contains greater than or equal to 80 mol % and less than or equal to 90 mol % of ethylene glycol-derived structural units, and greater than or equal to 10 mol % and less than or equal to 20 mol % of 1,4-cyclohexane dimethanol-derived structural units and/or neopentyl glycol-derived structural units, relative to diol-derived structural units, wherein the film lengthwise-direction and widthwise-direction storage elastic moduli at 100° C. are each greater than or equal to 100 MPa and less than or equal to 1000 MPa, the film lengthwise-direction and width-wise direction storage elastic moduli at 180° C. are each greater than or equal to 41 MPa and less than or equal to 400 MPa, and the stresses at the time of 100% elongation (F100 values) in the film lengthwise direction and width direction at 150° C. are each greater than or equal to 5 MPa and less than or equal to 60 MPa.

2. The biaxially oriented polyester film according to claim 1, comprising a laminate polyester film having a polyester A layer and a polyester B layer, wherein in a 1st run of differential scanning calorimetry (DSC), crystal melting peak temperature (TmA) of the polyester A layer is greater than or equal to 246° C. and less than or equal to 254° C., and crystal melting peak temperature (TmB) of the polyester B layer is greater than or equal to 235° C. and less than 246° C.

3. The biaxially oriented polyester film according to claim 2, wherein in a 2nd run of the differential scanning calorimetry (DSC), temperature-rise crystallization temperature (Tcc) of the laminate polyester film is greater than or equal to 170° C. and less than or equal to 190° C.

4. The biaxially oriented polyester film according to claim 1, wherein: the polyester A layer contains greater than or equal to 95 mol % and less than or equal to 99 mol % of the ethylene glycol-derived structural units, and greater than or equal to 1 mol % and less than or equal to 5 mol % of the 1,4-cyclohexane dimethanol-derived structural units and/or the neopentyl glycol-derived structural units, relative to the diol-derived structural units; and the polyester B layer contains greater than or equal to 80 mol % and less than or equal to 85 mol % of the ethylene glycol-derived structural units, and greater than or equal to 15 mol % and less than or equal to 20 mol % of the 1,4-cyclohexane dimethanol-derived structural units and/or the neopentyl glycol-derived structural units, relative to the diol-derived structural units.

5. The biaxially oriented polyester film according to claim 1, wherein: the polyester A layer contains greater than or equal to 90 mol % and less than 95 mol % of the ethylene glycol-derived structural units, and greater than 5 mol % and less than or equal to 10 mol % of the 1,4-cyclohexane dimethanol-derived structural units and/or the neopentyl glycol-derived structural units, relative to the diol-derived structural units; and the polyester B layer contains greater than or equal to 80 mol % and less than or equal to 90 mol % of the ethylene glycol-derived structural units, and greater than or equal to 10 mol % and less than or equal to 20 mol % of the 1,4-cyclohexane dimethanol-derived structural units and/or the neopentyl glycol-derived structural units, relative to the diol-derived structural units.

6. The biaxially oriented polyester film according to claim 1, wherein: the polyester A layer contains greater than or equal to 95 mol % and less than or equal to 100 mol % of terephthalic acid (including terephthalic acid ester) derived structural units relative to dicarboxylic acid (including dicarboxylic acid ester) derived structural units; and the polyester B layer contains greater than or equal to 95 mol % and less than or equal to 100 mol % of terephthalic acid (including terephthalic acid ester) derived structural units relative to dicarboxylic acid (including dicarboxylic acid ester) derived structural units.

7. The biaxially oriented polyester film according to claim 1, having lamination ratio H(–) between the polyester A layer and the polyester B layer greater than or equal to 0.01 and less than or equal to 0.4.

8. The biaxially oriented polyester film according to claim 1, wherein the polyester A layer is located at at least one of outermost layers.

9. The biaxially oriented polyester film according to claim 1, having thermal shrinkage ratios at 150° C. in the lengthwise direction and the widthwise direction are both greater than or equal to –1% and less than or equal to 1%.

10. The biaxially oriented polyester film according to claim 1, wherein a thermal deformation ratio of the film at 150° C. in at least one direction during a temperature rise from 25° C. to 220° C. at a temperature rise speed of 5° C/min, with a load of 19.6 mN, is 0 to +3%.

11. The biaxially oriented polyester film according to claim 1, wherein thermal deformation ratio of the film at 180° C. in at least one direction during a temperature rise from 25° C. to 220° C. at a temperature rise speed of 5° C/min, with a load of 19.6 mN, is 0 to +3%.

12. The biaxially oriented polyester film according to claim 2, wherein crystal melting peak temperature (Tm1) of a laminate polyester film in the 1st run of the differential scanning calorimetry (DSC) and crystal melting peak temperature (Tm2) of the entire film in a 2nd run satisfy the below-mentioned expression (I).

$$Tm1 < Tm2 \qquad (I)$$

13. A molded member comprising the biaxially oriented polyester film according to claim 1.

* * * * *